US012609793B2

(12) United States Patent
Kim et al.

(10) Patent No.: US 12,609,793 B2
(45) Date of Patent: Apr. 21, 2026

(54) METHOD FOR TRANSMITTING AND RECEIVING DATA IN WIRELESS COMMUNICATION SYSTEM, AND DEVICE FOR SAME

(71) Applicant: LG ELECTRONICS INC., Seoul (KR)

(72) Inventors: Hyungtae Kim, Seoul (KR); Jiwon Kang, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 17/429,487

(22) PCT Filed: Feb. 7, 2020

(86) PCT No.: PCT/KR2020/001772
§ 371 (c)(1),
(2) Date: Aug. 9, 2021

(87) PCT Pub. No.: WO2020/162711
PCT Pub. Date: Aug. 13, 2020

(65) Prior Publication Data
US 2022/0150011 A1      May 12, 2022

Related U.S. Application Data

(60) Provisional application No. 62/886,942, filed on Aug. 14, 2019, provisional application No. 62/825,760, filed on Mar. 28, 2019.

(30) Foreign Application Priority Data

Feb. 8, 2019    (KR) ........................ 10-2019-0015011

(51) Int. Cl.
H04L 5/00        (2006.01)
H04L 1/00        (2006.01)
H04W 72/23       (2023.01)

(52) U.S. Cl.
CPC .......... H04L 5/0048 (2013.01); H04L 1/0067 (2013.01); H04W 72/23 (2023.01)

(58) Field of Classification Search
CPC .................................................... H04L 5/0048
See application file for complete search history.

(56) References Cited

U.S. PATENT DOCUMENTS

2022/0070901 A1* 3/2022 Muruganathan ...... H04L 5/0051
2022/0085939 A1* 3/2022 Mondal ................. H04L 5/0048

FOREIGN PATENT DOCUMENTS

KR        20180050202        5/2018
WO        WO2014182503       11/2014

OTHER PUBLICATIONS

International Search Report and Written Opinion in International Appln. No. PCT/KR2020/001772, dated May 20, 2020, 5 pages.
(Continued)

*Primary Examiner* — Abdeltif Ajid
(74) *Attorney, Agent, or Firm* — Fish & Richardson P.C.

(57)        ABSTRACT

Disclosed in the present invention are a method for transmitting and receiving data in a wireless communication system, and a device for same. Specifically, a method, by which a terminal receives a data channel in a wireless communication system, may include: a step for receiving control resource setting information based on a first control resource set group and a second control resource set group; a step for receiving information about a cell reference signal pattern related to one among the first control resource set group and the second control resource set group; and a step for receiving i) a first data channel related to the first control resource set group and ii) a second data channel related to (Continued)

the second control resource set group, on the basis of the cell reference signal pattern.

11 Claims, 12 Drawing Sheets

(56)                    References Cited

OTHER PUBLICATIONS

AT&T, "Further details of PDSCH time-domain resource allocation before RRC connection setup," R1-1804650, Presented at 3GPP TSG RAN WG1 Meeting #92bis, Sanya, China, Apr. 16-20, 2018, 10 pages.
Nokia, Nokia Shanghai Bell, "Enhancements on Multi-TRP/Panel Transmission Document for: Discussion and Decision," R1-1813489, Presented at 3GPP TSG RAN WG1 Meeting #95, Spokane, USA, Nov. 12-16, 2018, 49 pages.
Huawei, HiSilicon, "PDSCH and PUSCH UE-specific parameters," R2-1802833, Presented at 3GPP TSG-RAN WG2 Meeting 101, Athens, Greece, Feb. 26-Mar. 2, 2018, 2 pages.

* cited by examiner

【FIG. 1】
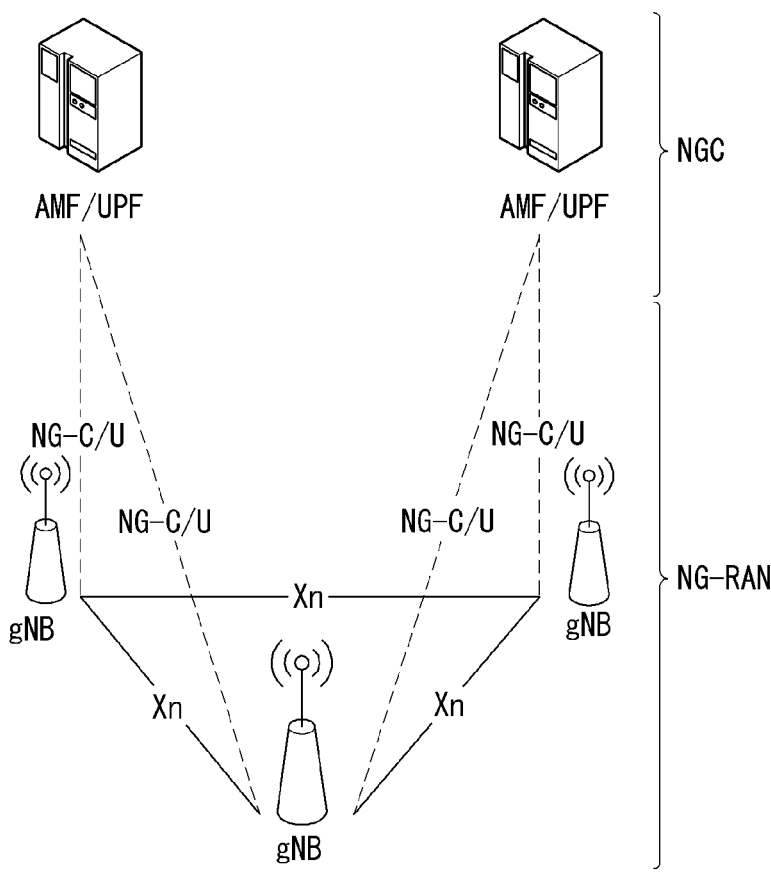
【FIG. 2】
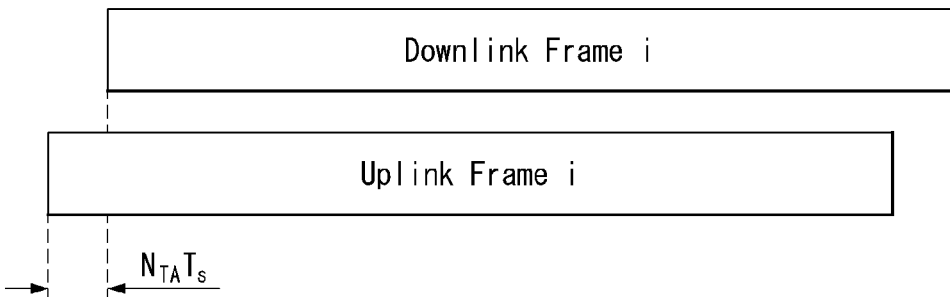

【FIG. 3】
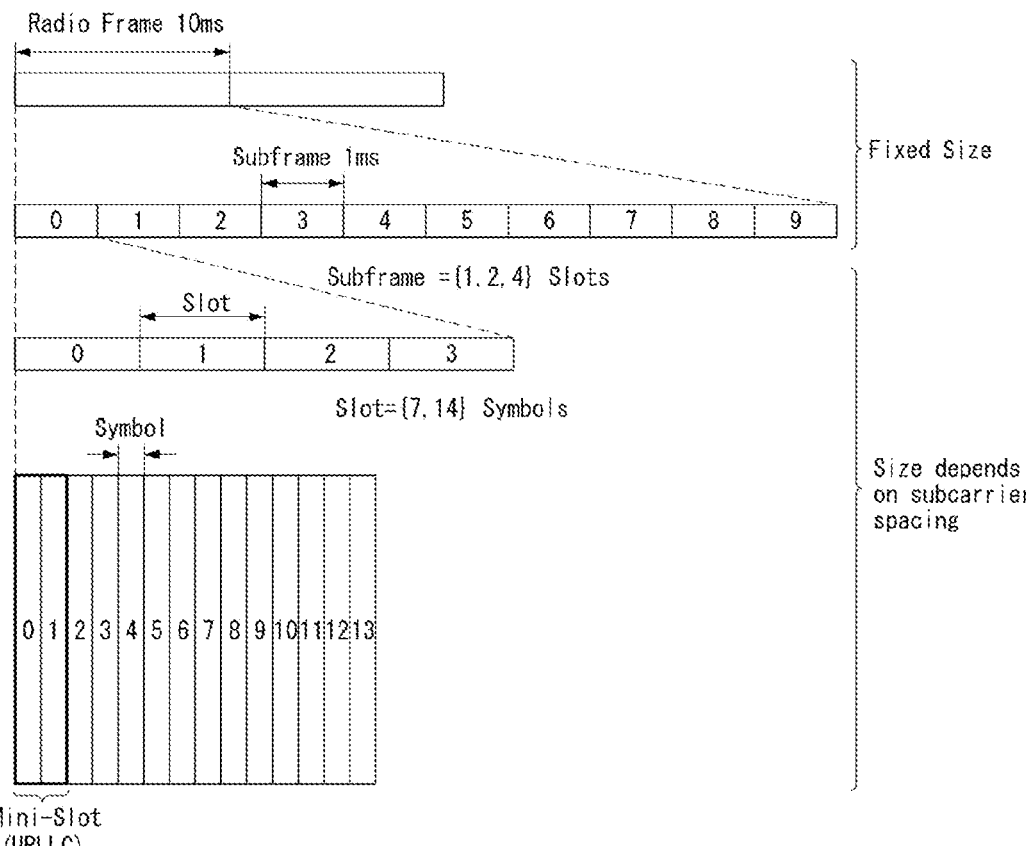

【FIG. 4】
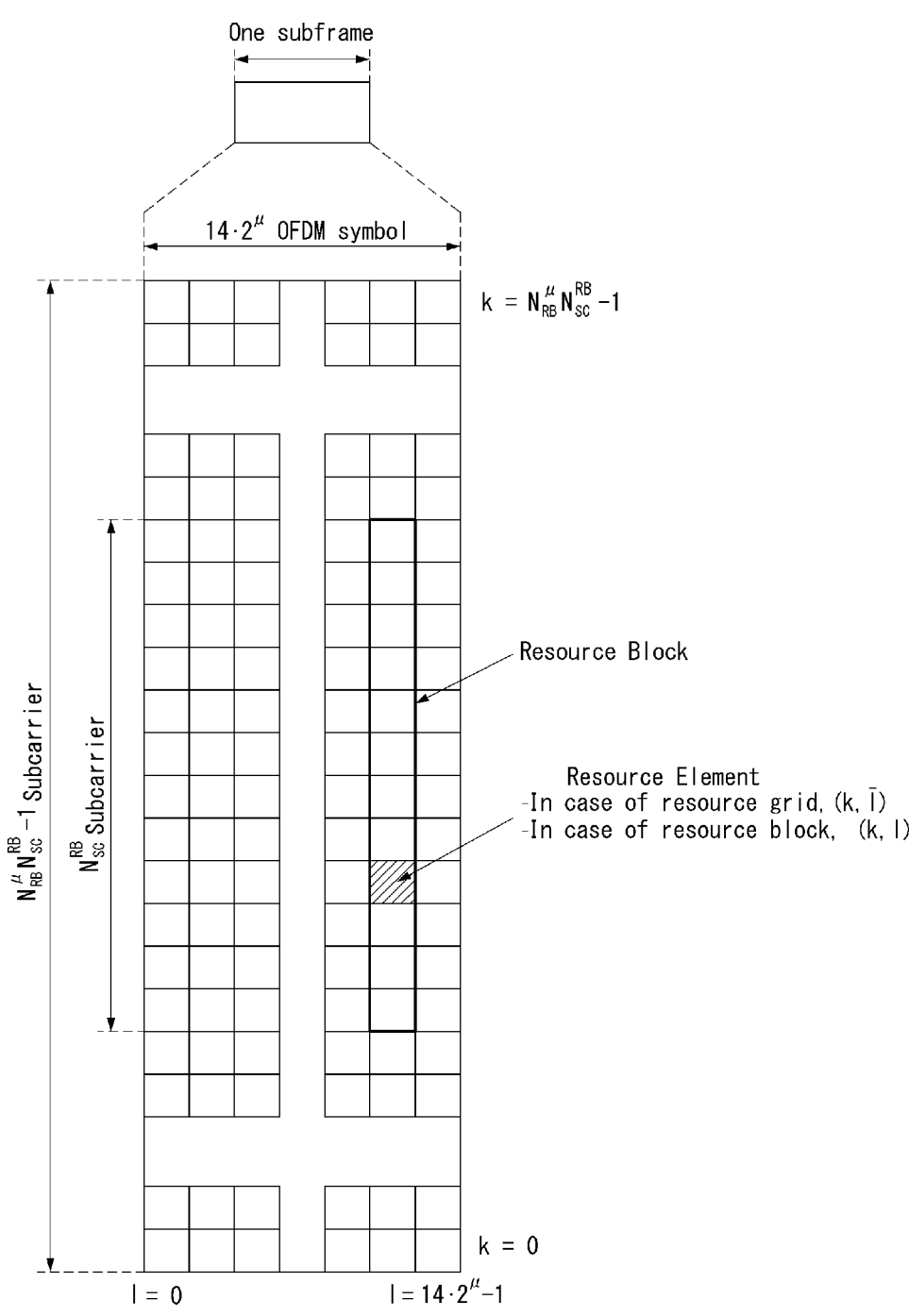

【FIG. 5】

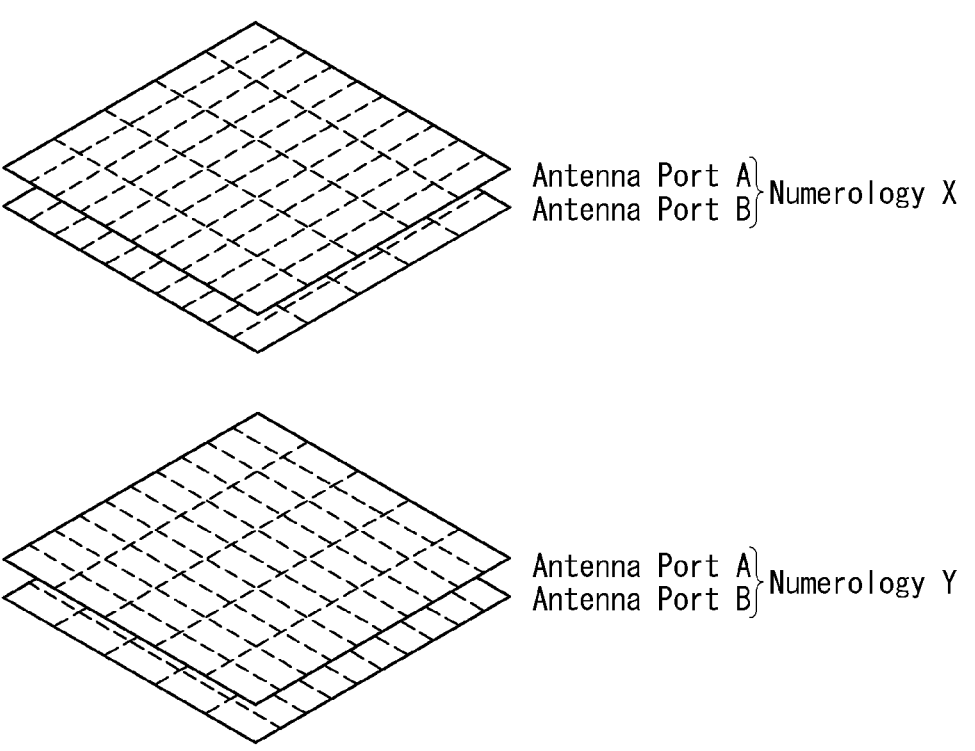

Antenna Port A
Antenna Port B } Numerology X

Antenna Port A
Antenna Port B } Numerology Y

【FIG. 6】

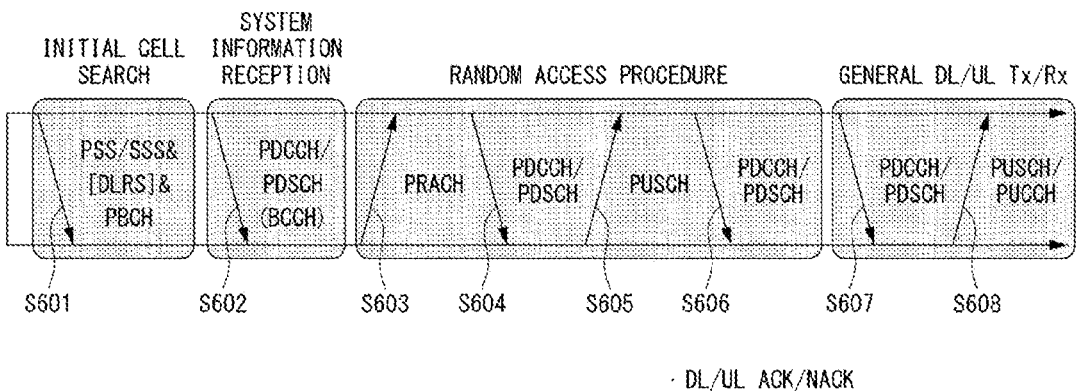

INITIAL CELL SEARCH

SYSTEM INFORMATION RECEPTION

RANDOM ACCESS PROCEDURE

GENERAL DL/UL Tx/Rx

PSS/SSS& [DLRS]& PBCH

PDCCH/ PDSCH (BCCH)

PRACH

PDCCH/ PDSCH

PUSCH

PDCCH/ PDSCH

PDCCH/ PDSCH

PUSCH/ PUCCH

S601     S602     S603     S604     S605     S606     S607     S608

· DL/UL ACK/NACK
· UE CQI/PMI RI REPORT
  USING PUSCH AND PUCCH

【FIG. 7】
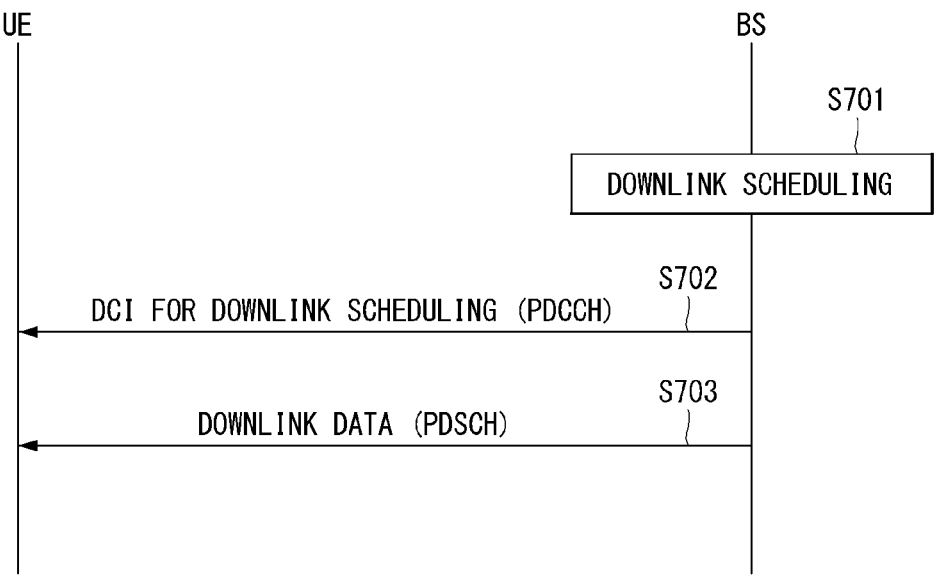
【FIG. 8】
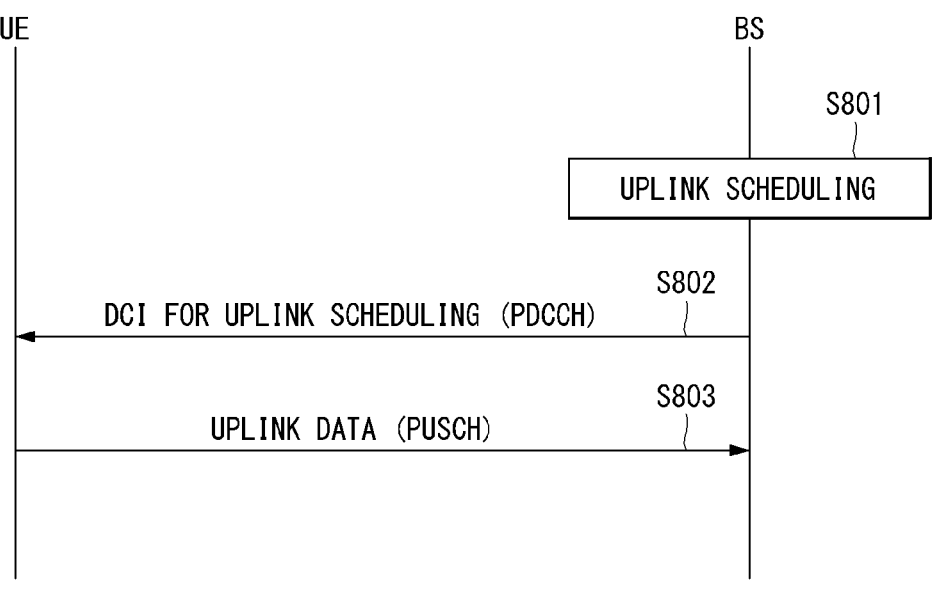

【FIG. 9】
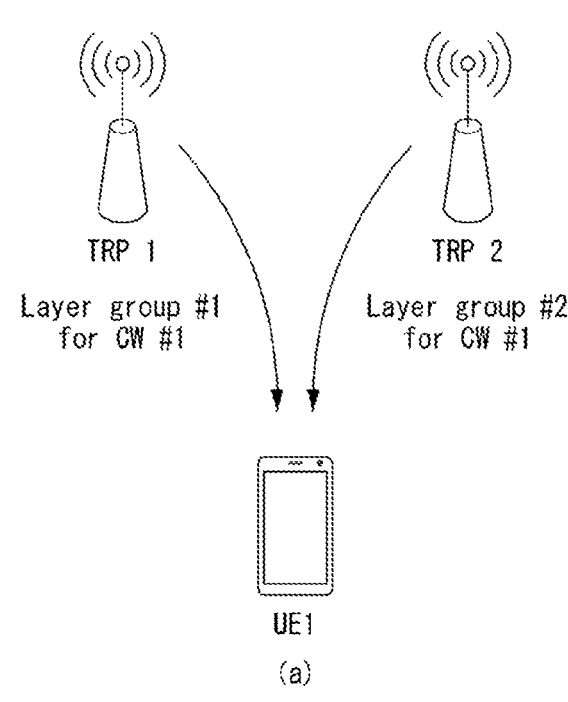
(a)
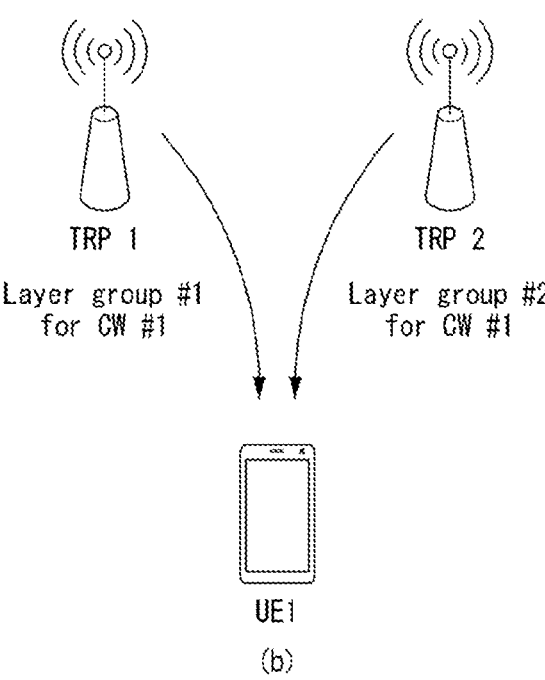
(b)

【FIG. 10】
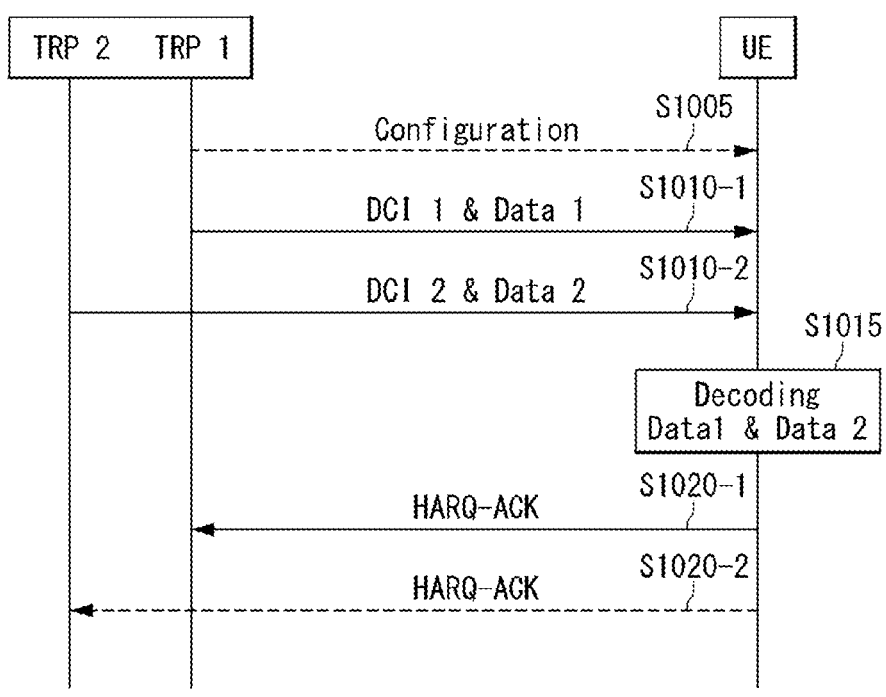
【FIG. 11】
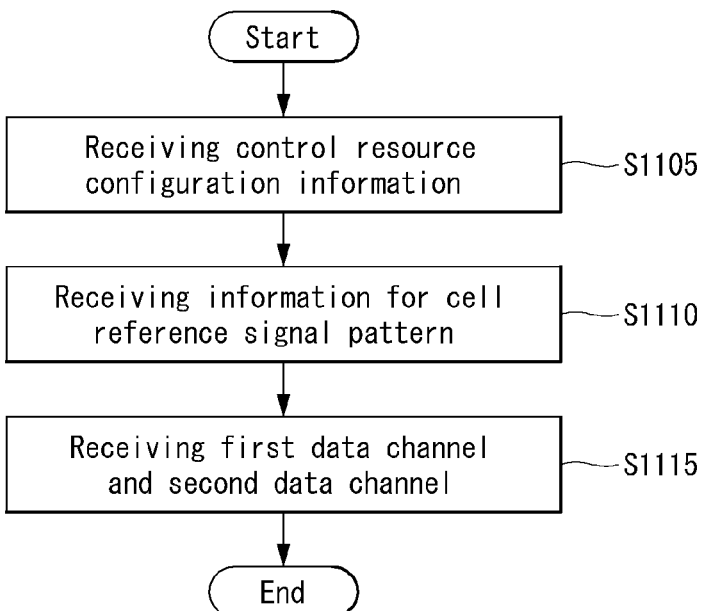

【FIG. 12】
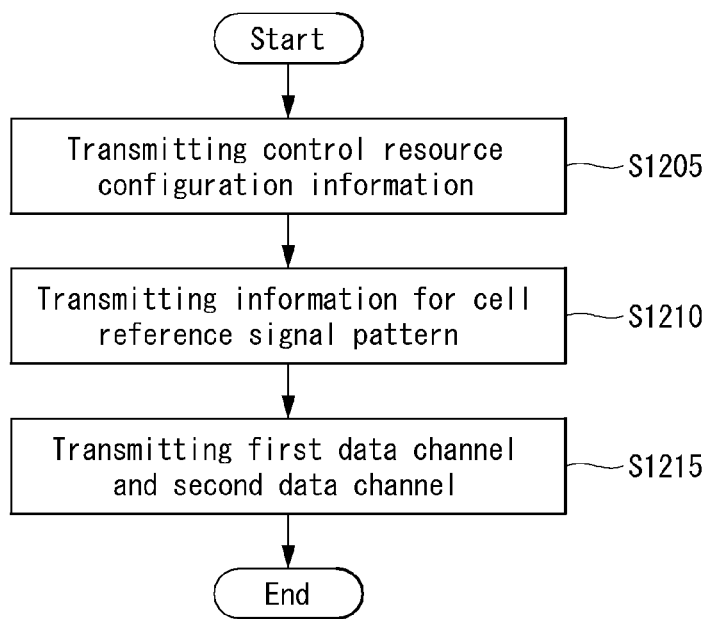
【FIG. 13】
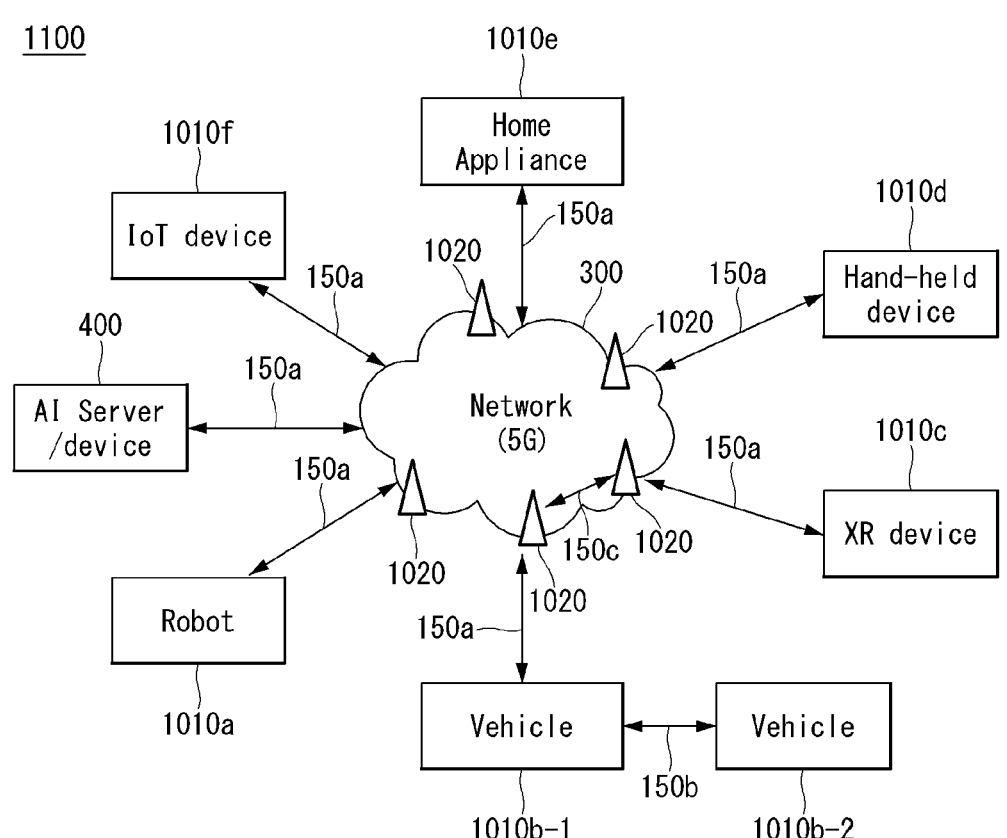

【FIG. 14】
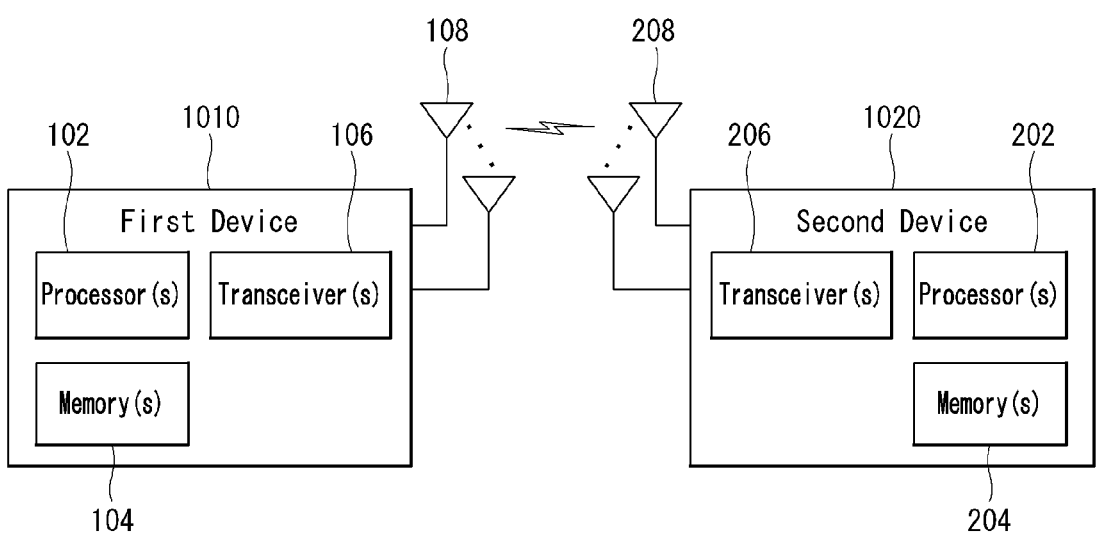
【FIG. 15】
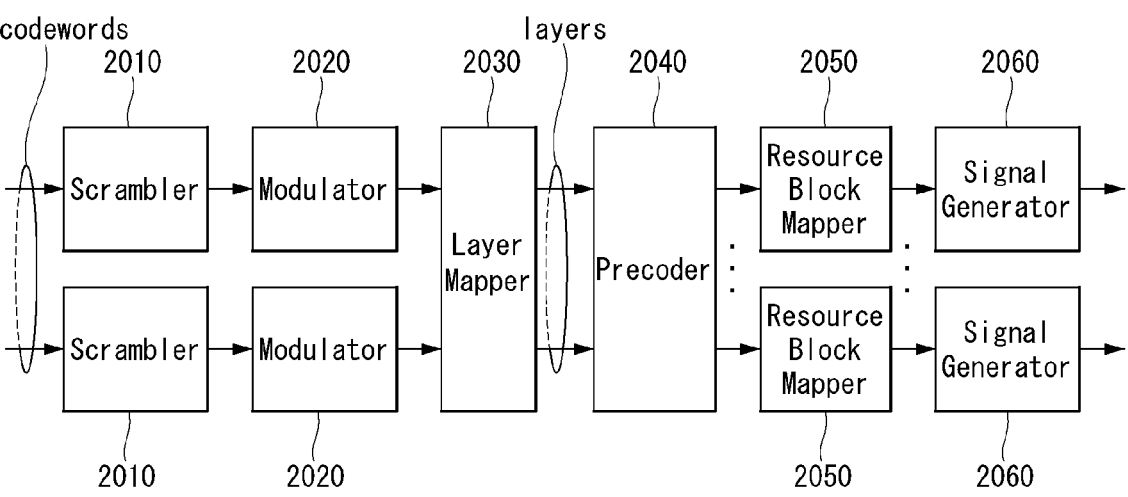

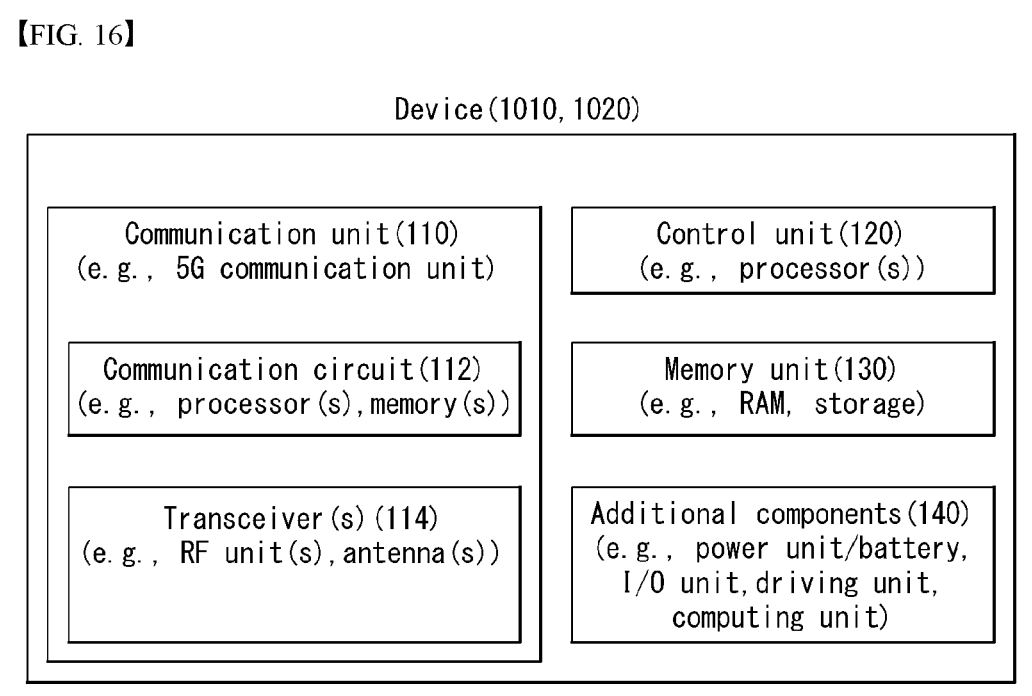

【FIG. 16】

Device(1010, 1020)

Communication unit(110)
(e.g., 5G communication unit)

Control unit(120)
(e.g., processor(s))

Communication circuit(112)
(e.g., processor(s),memory(s))

Memory unit(130)
(e.g., RAM, storage)

Transceiver(s)(114)
(e.g., RF unit(s),antenna(s))

Additional components(140)
(e.g., power unit/battery,
I/O unit,driving unit,
computing unit)

【FIG. 17】
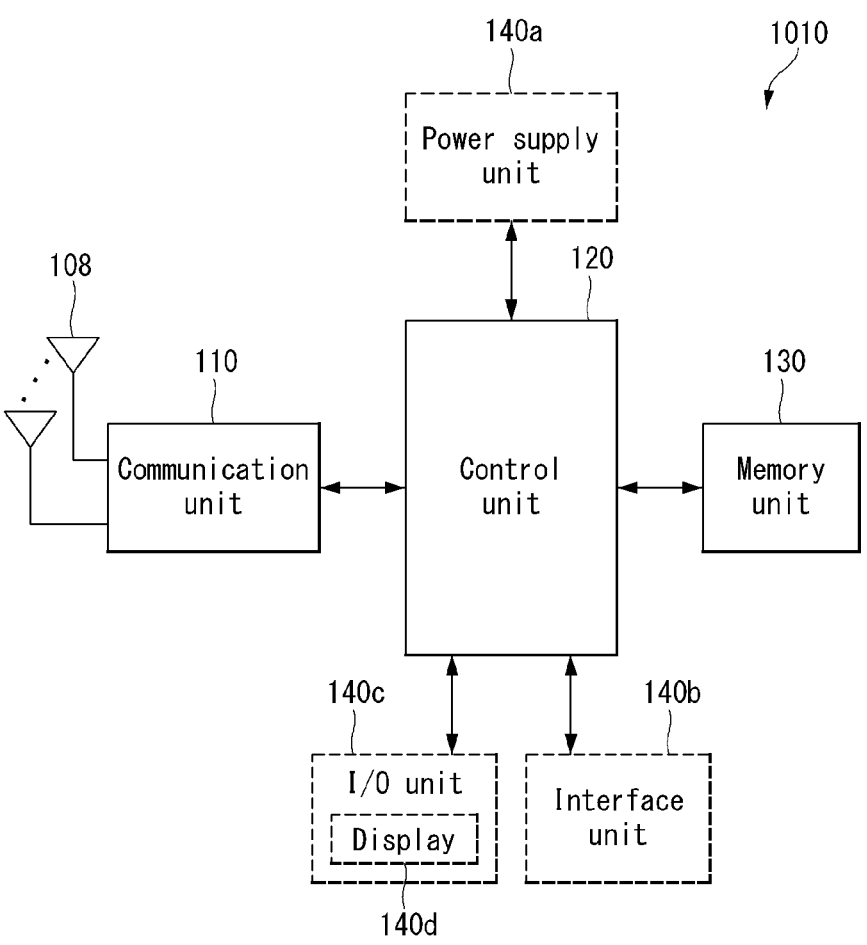
【FIG. 18】
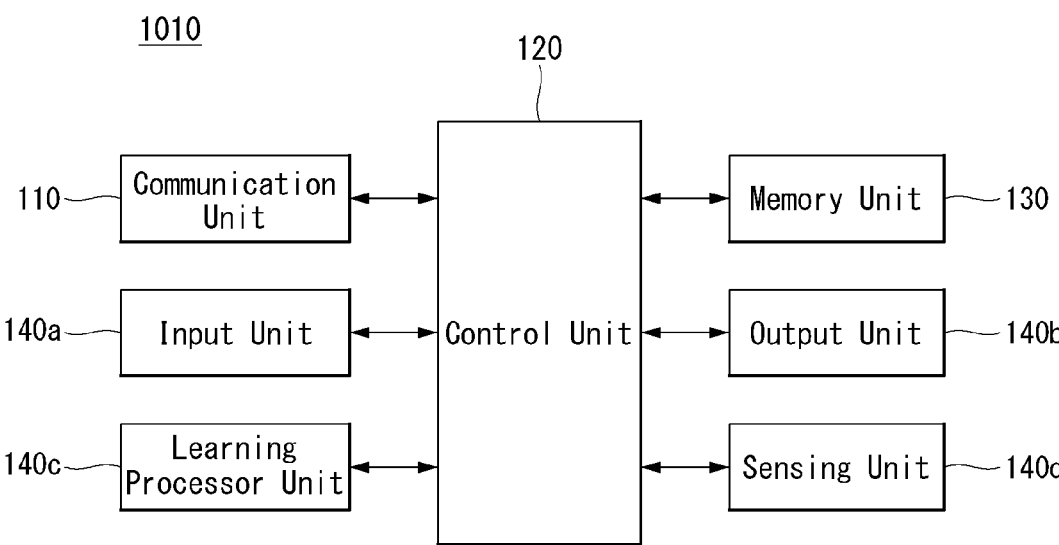

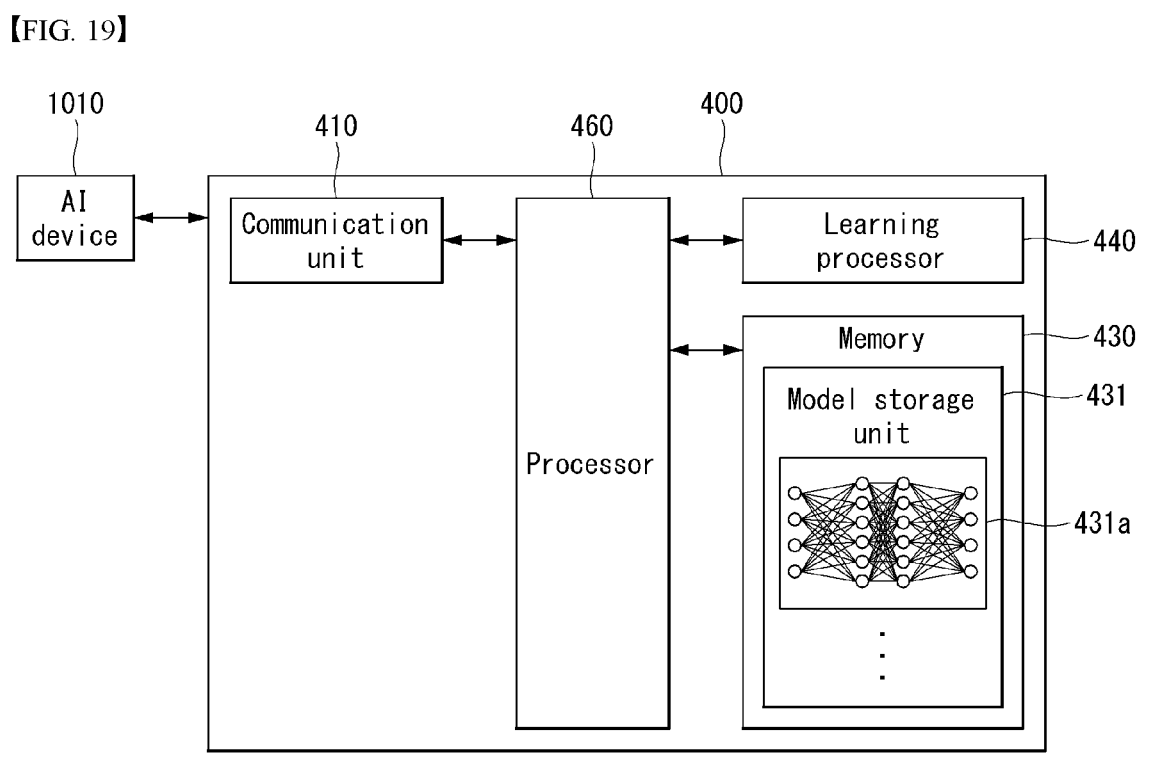

【FIG. 19】

METHOD FOR TRANSMITTING AND RECEIVING DATA IN WIRELESS COMMUNICATION SYSTEM, AND DEVICE FOR SAME

CROSS-REFERENCE TO RELATED APPLICATIONS

This application is a National Stage application under 35 U.S.C. § 371 of International Application No. PCT/ KR2020/001772, filed on Feb. 7, 2020, which claims the benefit of U.S. Application Ser. No. 62/886,942, filed on Aug. 14, 2019, U.S. Application Ser. No. 62/825,760, filed on Mar. 28, 2019, and Korean Application No. 10-2019-0015011, filed on Feb. 8, 2019. The disclosures of the prior applications are incorporated by reference in their entirety.

TECHNICAL FIELD

The present disclosure relates to a wireless communication system, and more specifically, to a method of applying a pattern of a cell reference signal (CRS) to transmit and receive data when a plurality of control resource set groups are configured in a user equipment (UE) and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

An aspect of the present disclosure proposes methods for transmitting and receiving data in a wireless communication system.

Another aspect of the present disclosure proposes a method for transmitting and receiving data in joint transmission based on a transmission point (TP)(s) and/or a transmission and reception point (TRP)(s) of a BS(s).

The present disclosure proposes a method of applying a pattern of a cell reference signal (CRS) to transmit and receive data when a plurality of control resource set groups are configured in a UE.

Technical objects to be achieved in the present disclosure are not limited to the aforementioned technical objects, and other technical objects not described above may be evidently understood by a person having ordinary skill in the art to which the present disclosure pertains from the following description.

Technical Solution

A method for receiving a data channel by a user equipment (UE) in a wireless communication system according to an embodiment of the present disclosure, the method may include receiving control resource configuration information based on a first control resource set group and a second control resource set group; receiving information for a cell reference signal pattern related to one of the first control resource set group and the second control resource set group; and receiving i) a first data channel related to the first control resource set group and ii) a second data channel related to the second control resource set group based on the cell reference signal pattern.

In addition, in the method according to an embodiment of the present disclosure, the first data channel and the second data channel may be received according to rate matching based on the cell reference signal pattern.

In addition, in the method according to an embodiment of the present disclosure, the rate matching may be applied to at least one resource element of a cell reference signal according to the cell reference signal pattern.

In addition, in the method according to an embodiment of the present disclosure, the method may further include receiving first downlink control information (DCI) based on the first control resource set group and second DCI based on the second control resource set group.

In addition, in the method according to an embodiment of the present disclosure, the first DCI and the first data channel may be received through a first transmission and reception point, and the second DCI and the second data channel may be received through a second transmission and reception point.

In addition, in the method according to an embodiment of the present disclosure, the first transmission and reception point and the second transmission and reception point may be configured to perform coordination transmission for the UE.

A user equipment (UE) receiving a data channel in a wireless communication system according to an embodiment of the present disclosure, the UE may include one or more transceivers; one or more processors; and one or more memories that store instructions for operations executed by the one or more processors, and are connected to the one or more processors, wherein the operations may include receiving control resource configuration information based on a first control resource set group and a second control resource set group; receiving information for a cell reference signal pattern related to one of the first control resource set group and the second control resource set group; and receiving i) a first data channel related to the first control resource set group and ii) a second data channel related to the second control resource set group based on the cell reference signal pattern.

A method for transmitting a data channel by a base station in a wireless communication system according to the present disclosure, the method may include transmitting control resource configuration information based on a first control resource set group and a second control resource set group; transmitting information for a cell reference signal pattern related to one of the first control resource set group and the second control resource set group; and transmitting i) a first data channel related to the first control resource set group and ii) a second data channel related to the second control resource set group based on the cell reference signal pattern.

A base station transmitting a data channel in a wireless communication system according to an embodiment of the present disclosure, the base station may include one or more transceivers; one or more processors; and one or more memories that store instructions for operations executed by the one or more processors, and are connected to the one or more processors, wherein the operations may include transmitting control resource configuration information based on a first control resource set group and a second control resource set group; transmitting information for a cell reference signal pattern related to one of the first control resource set group and the second control resource set group; and transmitting i) a first data channel related to the first control resource set group and ii) a second data channel related to the second control resource set group based on the cell reference signal pattern.

A device comprising one or more memories and one or more processors functionally connected to the one or more memories according to an embodiment of the present disclosure, wherein the one or more processors may control the device to receive control resource configuration information based on a first control resource set group and a second control resource set group; receive information for a cell reference signal pattern related to one of the first control resource set group and the second control resource set group; and receive i) a first data channel related to the first control resource set group and ii) a second data channel related to the second control resource set group based on the cell reference signal pattern.

One or more non-transitory computer-readable medium storing one or more instructions according to an embodiment of the present disclosure, wherein the one or more instructions, which are executable by one or more processors, may control a user equipment (UE) to receive control resource configuration information based on a first control resource set group and a second control resource set group; receive information for a cell reference signal pattern related to one of the first control resource set group and the second control resource set group; and receive i) a first data channel related to the first control resource set group and ii) a second data channel related to the second control resource set group based on the cell reference signal pattern.

Advantageous Effects

According to an embodiment of the present disclosure, there is an effect that DMRS-related interference and/or data-related interference between TRPs that may occur in a multi-TRP-based transmission and reception operation can be removed.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 shows an example of a downlink transmission/reception operation.

FIG. 8 shows an example of an uplink transmission/reception operation.

FIG. 9 illustrates examples of a multi-transmission and reception point (TRP)-based transmission and reception method.

FIG. 10 illustrates an example of signaling between a network side and a UE in a multi-TRP-based transmission and reception situation to which a method proposed in the present disclosure can be applied.

FIG. 11 shows an example of an operation flowchart of a terminal receiving data channel in a wireless communication system to which the method proposed in the present disclosure may be applied.

FIG. 12 shows an example of an operation flowchart of a BS transmitting data channel in a wireless communication system to which the method proposed in the present disclosure may be applied.

FIG. 13 illustrates a communication system applied to the present disclosure.

FIG. 14 illustrates a wireless device which may be applied to the present disclosure.

FIG. 15 illustrates a signal processing circuit for a transmit signal.

FIG. 16 illustrates another example of a wireless device applied to the present disclosure.

FIG. 17 illustrates a portable device applied to the present disclosure.

FIG. 18 illustrates an AI device applied to the present disclosure.

FIG. 19 illustrates an AI server applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the BS to the terminal and uplink (UL) means communication from the terminal to the BS. In downlink, a transmitter may be part of the BS, and a receiver may be part of the terminal. In uplink, the transmitter may be part of the terminal and the receiver may be part of the BS. The BS may be expressed as a first communication device and the terminal may be expressed as a second communication device. A BS (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE 36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control 38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480\cdot10^3$, and $N_f=4096$. DL and UL transmission is configured as a radio frame having a section of $T_f=(f_{max}N_f/100)\cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM symbols of $$N_{symb}^\mu, \text{ and } N_{symb}^\mu$$

is determined depending on a numerology used and slot configuration. The start of slots $$n_s^\mu$$

in a subframe is aligned in time with the start of OFDM symbols $$n_s^\mu N_{symb}^\mu$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $$N_{PB}^{\mu} N_{sc}^{RB}$$

subcarriers on a frequency domain, each subframe consisting of $14 \cdot 2\mu$ OFDM symbols, but the present disclosure is not limited thereto.

In the NR system, a transmitted signal is described by one or more resource grids, consisting of $$N_{PB}^{\mu} N_{sc}^{RB}$$

subcarriers, and $$2^{\mu} N_{symb}^{(\mu)}$$

OFDM symbols, where $$N_{PB}^{\mu} \le N_{RB}^{max,\mu} \cdot N_{RB}^{max,\mu}$$

denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair $(k,\bar{l})$, where $$k = 0, \ldots , N_{PB}^{\mu} N_{sc}^{RB} - 1$$

is an index on a frequency domain, and $$\bar{l} = 0, \ldots , 2^{\mu} N_{synb}^{(\mu)} - 1$$

refers to a location of a symbol in a subframe. The index pair $(k,l)$ is used to refer to a resource element in a slot, where $$l = 0, \ldots , N_{synb}^{\mu} - 1.$$

The resource element $(k,\bar{l})$ for the numerology $\mu$ and the antenna port p corresponds to a complex value $$a_{k,\bar{l}}^{\langle p,\mu \rangle}.$$

When there is no risk for confusion or when a specific antenna port or numerology is not specified, the indices p and $\mu$ may be dropped, and as a result, the complex value may be $$a_{k,l}^{(p)}$$

or $a_{k,l}$.

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor$$    [Equation 1]

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. Of the BWP. A relation between the physical resource block $n_{PRB}$ in BWP i and the common resource block $n_{CRB}$ may be given by the following Equation 2.
[Equation 2]

$$n_{CRB} = n_{PRB} + N_{BWP,i}^{start}$$

Here, $$N_{BWP,i}^{start}$$

may be the common resource block where the BWP starts relative to the common resource block 0.
Physical Channel and General Signal Transmission FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.
Downlink Transmission and Reception Operation FIG. 7 illustrates an example of a downlink transmission and reception operation.

The eNB may schedule downlink transmission such as the frequency/time resource, the transport layer, an downlink precoder, the MCS, etc., (S701). As one example, the eNB may determine a beam for PDSCH transmission to the UE.

The UE may receive Downlink Control Information (DCI) for downlink scheduling (i.e., including scheduling information of the PDSCH) on the PDCCH (S702).

DCI format 1_0 or DCI format 11 may be used for the downlink scheduling and DCI format 11 may include information such as the following examples. For example, DCI format 1_1 includes at least one of Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled, and single-user (SU)/Multi-user (MU) transmission scheduling is also available.

Further, a TCI field is configured with 3 bits, and the QCL for the DMRS may be dynamically indicated by indicating a maximum of 8 TCI states according to a TCI field value.

The UE may receive downlink data from the eNB on the PDSCH (S703).

When the UE detects a PDCCH including the DCI format 1_0 or 1_1, the UE may decode the PDSCH according to the indication by the corresponding DCI. Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

Uplink Transmission and Reception Operation

FIG. 8 illustrates an example of an uplink transmission and reception operation.

The eNB may schedule uplink transmission such as the frequency/time resource, the transport layer, an uplink precoder, the MCS, etc., (S801). In particular, the eNB may determine a beam for PUSCH transmission of the UE.

The UE may receive, from the eNB, DCI for downlink scheduling (i.e., including scheduling information of the PUSCH) on the PDCCH (S802).

DCI format 0_0 or 0_1 may be used for the uplink scheduling and in particular, DCI format 0_1 may include information such as the following examples. For example, DCI format 0_1 may include at least one of Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

The UE may transmit the uplink data to the eNB on the PUSCH (S803).

When the UE detects a PDCCH including DCI format 0_0 or 0_1, the UE may transmit the corresponding PUSCH according to the indication by the corresponding DCI.

Codebook based transmission scheme and non-codebook based transmission scheme are supported for PUSCH transmission.

i) When higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 01, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "nonCodebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

An antenna port is defined so that a channel in which symbols on an antenna port are carried is inferred from a channel in which other symbols on the same antenna port are carried. If the property of a channel in which symbols on one antenna port are carried may be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

"QCL-TypeA": {Doppler shift, Doppler spread, average delay, delay spread}

"QCL-TypeB": {Doppler shift, Doppler spread}

"QCL-TypeC": {Doppler shift, average delay}

"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and QCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

Multiple Transmission and Reception Point (TRP)-Related Operation

The Coordinated Multi Point (CoMP) technique is a scheme in which a plurality of base stations exchange (e.g. using the X2 interface) or utilize channel information (e.g. RI/CQI/PMI/LI, etc.) fed back from the UE with each other, and cooperatively transmit to the UE, thereby effectively controlling interference. According to a scheme used, the cooperative transmission may be divided into joint transmission (JT), coordinated scheduling (CS), coordinated beamforming (CB), dynamic point selection (DPS), dynamic point blacking (DPB), and the like.

The M-TRP transmission scheme in which M TRPs transmit data to one user equipment (UE) may be divided into two types: eMBB M-TRP transmission, which is a scheme for increasing the transmission rate, and URLLC M-TRP transmission, which is a scheme for increasing reception success rate and reducing delay. Hereinafter, in the present disclosure, the method(s) will be described based on "TRP" for convenience of description, but in the following description, "TRP" may be replaced with and applied for expressions such as a cell, a panel, a transmission point (TP), and a base station (gNB, etc.).

In addition, from the viewpoint of downlink control information (DCI) transmission, the M-TRP (multiple TRP) transmission scheme may be divided into i) M-DCI (multiple DCI)-based M-TRP transmission scheme in which each TRP transmits a different DCI, and ii) S-DCI (single DCI)-based M-TRP transmission scheme in which one TRP transmits DCI. For example, in the case of S-DCI, since all scheduling information for data transmitted by the M TRPs should be delivered through one DCI, it can be used in an ideal BackHaul (BH) environment where dynamic cooperation between two TRPs is possible.

A number of schemes may be considered in TDM-based URLLC. As an example, scheme 4 means a scheme in which one TRP transmits a TB in one slot, and has the effect of increasing the data reception probability through the same TB received from several TRPs in several slots. In contrast, scheme 3 may mean a scheme in which one TRP transmits a TB through several consecutive OFDM symbols (that is, a symbol group), and may be configured so that several TRPs transmit the same TB through different symbol groups in one slot.

In addition, the UE may recognize the PDSCH/PUSCH (or PUCCH) scheduled by DCI received with different CORESETs (or CORESETs belonging to different CORESET groups/pools) as PDSCH received from different TRPs or PUSCH (or PUCCH) transmitted to different TRPs. That is, according to information (e.g. index) on the CORESET group/pool, the UE may distinguish or identify the TRP to be transmitted and received with itself. In addition, the scheme for UL transmission (e.g. PUSCH/PUCCH) transmitting to different TRPs may be equally applied to UL transmission (e.g. PUSCH/PUCCH) transmitting to different panels belonging to the same TRP.

Multiple DCI-Based/Single DCI-Based Cooperative Transmission

Non-coherent joint transmission (NCJT) is a method in which multiple Transmission Points (TPs) transmit data to one User Equipment (UE) using the same time frequency, and transmit data to different layers using different Demodulation Multiplexing Reference Signal (DMRS) ports between the TPs. The TP delivers data scheduling information to the UE receiving the NCJT through Downlink Control Information (DCI), at this time, a scheme in which each TP participating in the NCJT delivers scheduling information for data transmitted by itself via the DCI may be referred to as multi-DCI-based cooperative transmission (e.g. multi DCI based NCJT). Since N TPs participating in NCJT transmission transmit DL grants (i.e. DL DCI) and PDSCHs to the UE, respectively, the UE receives N DCIs and N PDSCHs through N TPs.

In contrast, a scheme in which one representative TP transmits scheduling information for data transmitted by itself and data transmitted by another TP via one DCI may be referred to as single DCI-based cooperative transmission (e.g. single DCI based NCJT). In this case, N TPs transmit one PDSCH, but each TP transmits only some layers among multiple layers constituting one PDSCH. For example, when 4 layer data is transmitted, TP 1 may transmit 2 layers and TP 2 may transmit the remaining 2 layers to the UE.

Multiple TPs (or multiple TRPs, MTRPs) performing NCJT transmission may perform DL data transmission to the UE using the following two schemes.

First, a single DCI-based MTRP scheme will be discussed. The MTRP may cooperatively transmit one common PDSCH, and each TRP participating in the cooperative transmission may transmit the corresponding PDSCH by spatially dividing it into different layers (i.e. different DMRS ports). In this case, the scheduling information for the PDSCH may be instructed to the UE through one DCI, and the corresponding DCI may include information on which DMRS port uses which QCL RS and QCL type information (this may be different from instructing the QCL RS and TYPE commonly applied to all DMRS ports previously instructed in the DCI). That is, M TCI states may be instructed through the TCI field in DCI (e.g. M=2 in case of 2 TRP cooperative transmission), and the QCL RS and type may be identified using M different TCI states for each M DMRS port group. In addition, DMRS port information may be instructed using a new DMRS table.

Second, a multiple DCI based MTRP scheme will be discussed. The MTRP transmit different DCIs and PDSCHs, respectively, and the corresponding PDSCHs overlap each other (some or all) on frequency and time resources and are transmitted. The corresponding PDSCHs may be scrambled through different scrambling IDs, and the corresponding DCIs may be transmitted through CORESETs belonging to different Control Resource Set (CORESET) groups (or CORESET pools). Here, the CORESET group may be a specific index defined in CORESET configuration information of each CORESET. For example, if CORESET 1 and CORESET 2 are configured (or mapped) to index=0 and CORESET 3 and CORESET 4 are configured to index=1, then CORESETs 1 and 2 may belong to CORESET group 0, CORESETs 3 and 4 may belong to CORESET group 1. Al so, if the corresponding index is not defined in CORESET, it may be interpreted as CORESET group 0 (i.e. index=0). When a plurality of scrambling IDs are configured, or a plurality of CORESET groups (e.g. two CORESET groups) are configured in one serving cell, the UE may recognize (or identify) that it will receive data (e.g. PDSCH) through multiple DCI based MTRP operations.

At this time, information on whether it is the single DCI based MTRP scheme or the multiple DCI based MTRP scheme may be instructed to the UE through separate signaling or the like. As an example, when a plurality of cell reference signal (CRS) patterns for MTRP operation for one serving cell are instructed to the UE, PDSCH rate matching for the CRS may be configured or defined differently depending on whether it is the single DCI-based MTRP scheme or the multiple DCI-based MTRP scheme.

In addition, schemes shown in FIG. 9 may be considered as a transmission/reception method for improving reliability using multiple TRP-based transmission. FIG. 9 illustrates examples of a multi-transmission and reception point (TRP)-based transmission and reception method.

FIG. 9 (a) illustrates an example in which a layer group transmitting the same codeword (CW)/Transport Block (TB) corresponds to different TRPs. In this case, the layer group may mean a layer set including one or more layers. In this case, there is an advantage that the amount of transmission resources increases due to a plurality of layers, and a (robust) channel coding of a low code rate can be used for a transport block (TB) through this. In addition, since the channels transmitted from a plurality of TRPs are different, it can be expected to improve reliability of a received signal based on a diversity gain.

FIG. 9 (b) illustrates an example of transmitting different CWs through layer groups corresponding to different TRPs. In this case, it may be assumed that TBs corresponding to a first CW (CW #1) and a second CW (CW #2) are the same. Accordingly, the scheme shown in FIG. 9 (b) may be seen as an example of repeated transmission of the same TB. In the case of FIG. 9 (b), the code rate corresponding to the TB may be higher than that of FIG. 9 (a). However, there is an advantage that the code rate may be adjusted by instructing different redundancy version (RV) values for encoding bits generated from the same TB according to the channel environment, or that the modulation order of each CW may be adjusted.

In addition, as in FIG. 9, it may be considered a scheme for increasing the data reception probability by repeatedly transmitting the same TB through different layer groups, and by transmitting each layer group by a different TRP and/or panel. Such a scheme may be referred to as a spatial division multiplexing (SDM)-based M-TRP URLLC transmission scheme. Layer(s) belonging to different layer groups may be transmitted through DMRS port(s) belonging to different DMRS code division multiplexing (CDM) groups, respectively.

In addition, the above-described multi-TRP-based transmission related content has been described based on an SDM scheme using different layers, but it goes without saying that this may be extended and applied to a frequency division multiplexing (FDM) scheme based on different frequency domain resources (e.g. RB, PRB (set)) and/or a time division multiplexing (TDM) scheme based on different time domain resources (e.g. slot, symbol, sub-symbol, etc.).

Hereinafter, Table 5 shows an example of the above-described multiple TRP-based transmission-related schemes.

TABLE 5

Schemes for multi-TRP based URLLC, scheduled by single DCI at least, are clarified as following:
    Scheme 1 (SDM): n (n <= $N_s$) TCI states within the single slot, with overlapped time and frequency resource allocation
    Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.
    Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different.

TABLE 5-continued

Scheme 1c: One transmission occasion is one layer of the same TB with one DMRS port
associated with multiple TCI state indices, or one layer of the same TB with multiple DMRS ports
associated with multiple TCI state indices one by one. For Scheme 1a and 1c, the same MCS is
applied for all layers or layer sets.
    Scheme 2 (FDM): n (n <= $N_f$) TCI states within the single slot, with non-overlapped
frequency resource allocation. Each non-overlapped frequency resource allocation is associated
with one TCI state. Same single/multiple DMRS port(s) are associated with all non-overlapped
frequency resource allocations.
    Scheme 2a: Single codeword with one RV is used across full resource allocation. From UE
perspective, the common RB mapping (codeword to layer mapping) is applied across full resource
allocation.
    Scheme 2b: Single codeword with one RV is used for each non-overlapped frequency
resource allocation. The RVs corresponding to each non-overlapped frequency resource allocation
can be the same or different.
    For scheme 2a, same MCS is applied for all non-overlapped frequency resource allocations
    Scheme 3 (TDM): n (n <= $N_{t1}$) TCI states within the single slot, with non-overlapped
time resource allocation. Each transmission occasion of the TB has one TCI and one RV with the
time granularity of mini-slot. All transmission occasion (s) within the slot use a common MCS
with same single or multiple DMRS port(s). RV/TCI state can be same or different among
transmission occasions.
    Scheme 4 (TDM): n (n <= $N_{t2}$) TCI states with K (n <= K) different slots. Each
transmission occasion of the TB has one TCI and one RV. All transmission occasion (s) across K
slots use a common MCS with same single or multiple DMRS port(s). RV/TCI state can be same
or different among transmission occasions.

In the present disclosure, "/" may mean that all the contents separated by "/" are included (and) or only some of the separated contents are included (or). In addition, in this disclosure, the following terms are used in a unified manner for convenience of description. However, the use of these terms does not limit the technical scope of the present disclosure.

A base station (BS) described in the present disclosure may be a generic term for an object that transmits/receives data to and from a terminal (or a user equipment (UE)). For example, the BS described herein may be a concept including one or more transmission points (TP), one or more transmission and reception points (TRP), and the like. For example, multiple TPs and/or multiple TRPs described herein may be included in one BS or included in multiple BSs. In addition, the TP and/or TRP may include a panel of a BS, a transmission and reception unit, and the like.

When the BS transmits and receives data (e.g., DL-SCH, PDSCH, etc.) to and from the terminal, a non-coherent joint transmission (NCJT) scheme may be considered. Here, NCJT may refer to joint transmission that does not consider interference (i.e., joint transmission without interference). As an example, NCJT may be a method for the BS(s) to transmit data to one terminal through multiple TPs using the same time resource and frequency resource. In the case of this scheme, multiple TPs of the BS(s) may be configured to transmit data to the terminal through different layers using different demodulation reference signal (DMRS) ports.

The BS may deliver (or transmit) information for scheduling the corresponding data to the terminal which receives data or the like based on the NCJT method through downlink control information (DCI). In this case, a method in which the BS(s) participating in the NCJT scheme transmits, through the DCI, scheduling information for data transmitted by itself through each TP may be referred to as a multi-DCI-based NCJT. In contrast, a method in which a representative TP among TPs of the BS(s) participating in the NCJT scheme transmits, through one DCI, scheduling information for data transmitted by itself and data transmitted through other TP(s) may be referred to as single-DCI-based NCJT. The embodiments and methods described in the present disclosure are mainly described based on the single-DCI-based NCJT, but of course, they may be extended and applied to the multi-DCI-based NCJT.

In addition, in relation to the aforementioned method, a configuration and/or indication method may be different according to the degree of overlapping of time resources and/or frequency resources. As an example, an NCJT scheme in which time resources and frequency resources used for transmission by each BS are completely overlapped may be referred to as a fully overlapped NCJT scheme.

In addition, an NCJT scheme in which time resources and/or frequency resources used by each BS for transmission are partially overlapped may be referred to as a partially overlapped NCJT (NCJT) scheme. This is only for convenience of description in the present disclosure, and the terms described above in the embodiments and methods to be described below may be replaced with other terms having the same technical meaning. For example, in the case of the partially overlapped NCJT, both data of a first BS (e.g., TP 1) and data of a second BS (e.g., TP 2) may be transmitted in some time resources and/or frequency resources, and only data of any one of the first BS or the second BS may be transmitted in the remaining time resources and/or frequency resources.

Hereinafter, in the present disclosure, methods that may be proposed when considering joint transmission (e.g., NCJT) between a plurality of BSs (e.g., multiple TP/TRPs of one or more BSs, etc.) and a terminal in a wireless communication system will be described. Hereinafter, the methods described in this disclosure are described based on one or more TP/TRPs of the BS(s), but the corresponding methods may also be applied in the same or similar manner to transmission based on one or more panels of the BS(s).

When LTE service and NR service are simultaneously provided in one TRP and/or cell, and both services share the same frequency band, a cell reference signal (CRS) in the LTE system may receive interference from RS/data/control information of the NR system.

In order to prevent such interference, it may be used a scheme of rate matching data of the NR system to the location of a resource element (RE) allocated to the CRS by instructing a specific parameter (e.g. lte-CRS-ToMatchAround) to the UE of the NR system. That is, it may be configured to operate on the premise that on the base station side, the base station does not allocate data of the NR system to the RE allocated to the corresponding CRS, and that on the UE side, data of the NR system is not allocated for the RE allocated to the corresponding CRS. In addition, in order to prevent the DeModulation Reference Signal (DMRS) of the NR system and the CRS of the LTE system from colliding, it may also be used a scheme of changing (or shifting) the symbol location (i.e. OFDM symbol location) of the DMRS of the NR system. Such an instruction may be delivered or performed through higher layer signaling.

For example, for the case of PDSCH mapping type A, lte-CRS-ToMatchAround is configured, dmrs-AdditionalPosition is 'pos1', and single symbol DMRS, there may be a case in which a certain DMRS symbol and a certain symbol including a common RS instructed by the lte-CRS-ToMatchAround are the same. In this case, the DMRS locations for the PDSCH durations of 13 and 14 may be replaced with {1_0, 12} instead of the default {1_0, 11}. That is, when the DMRS symbol of the NR system and the symbol for the common RS of the LTE system overlap, the DMRS location may be shifted by a predefined value. Such an instruction may be performed through the higher layer parameter servingCellConfigCommon IE as shown in Table 6 below.

mentioned example, when resources partially overlap on the time axis, the OFDM symbol locations of DMRS transmitted by two cells may be changed, and as a result, mutual interference may occur between the data of the first cell and the DMRS of the second cell, and mutual interference may occur between the data of the second cell and the DMRS of the first cell. In this case, channel estimation performance for DMRS may be degraded. To solve this problem, it may also be considered a scheme in which the base station guarantees the OFDM symbol locations of two DMRSs to be the same. If the OFDM symbol locations of the two DMRSs are the same, since the DMRS transmitted by each cell is FDM-ed with different CDM groups and transmitted, interference between the DMRSs can be removed. In addition, since data may be rate matched in units of CDM groups, interference between data and DMRS may also be removed.

In addition, when the first cell performs the service of the LTE system and the service of the NR system at the same time, the corresponding cell may perform CRS transmission in every slot, and the data may be rate matched at the RE location to which the CRS is allocated in order to remove interference caused by NR data and/or DMRS to the CRS. AI so, when a collision occurs between the DMRS and the

TABLE 6

ServingCellConfigCommon
The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.
ServingCellConfigCommon information element

```
-- ASN1START
-- TAG-SERVINGCELLCONFIGCOMMON-START
ServingCellConfigCommon ::=        SEQUENCE {
    physCellId                         PhysCellId
    downlinkConfigCommon                   DownlinkConfigCommon
    uplinkConfigCommon                     UplinkConfigCommon
    supplementaryUplinkConfig          UplinkConfigCommon
    n-TimingAdvanceOffset              ENUMERATED { n0, n25600, n39936 }
    ssb-PositionsInBurst           CHOICE {
        shortBitmap                        BIT STRING (SIZE (4)),
        mediumBitmap                       BIT STRING (SIZE (8)),
        longBitmap                         BIT STRING (SIZE (64))
    }
    ssb-periodicityServingCell     ENUMERATED { ms5, ms10, ms20, ms40, ms80, ms160, spare2,
spare1 }
    dmrs-TypeA-Position                ENUMERATED {pos2, pos3},
    lte-CRS-ToMatchAround              SetupRelease { RateMatchPatternLTE-CRS }
    rateMatchPatternToAddModList           SEQUENCE (SIZE (1..maxNrofRateMatchPatterns)) OF
RateMatchPattern
    rateMatchPatternToReleaseList          SEQUENCE (SIZE (1..maxNrofRateMatchPatterns)) OF
    RateMatchPatternId
    ssbSubcarrierSpacing           SubcarrierSpacing
    tdd-UL-DL-ConfigurationCommon      TDD-UL-DL-ConfigCommon
    ss-PBCH-BlockPower                 INTEGER (−60..50),
    ...
}
```

Hereinafter, in the present disclosure, method(s) will be described based on "cell" for convenience of description, but in the following description, the "cell" may be replaced with and applied for expressions such as a panel, a transmission and reception point (TRP), a transmission point (TP), and a base station (gNB, etc.).

When one UE receives data from two cells, frequency and time resources of data received from the two cells may partially overlap with each other. For example, a first cell (cell #1) may use OFDM symbols 1, 2, and 3 for data transmission, and a second cell (cell #2) may use OFDM symbols 2, 3, and 4 for data transmission. As the above- CRS, the symbol location of the DMRS may be changed in order to prevent the corresponding collision. At this time, if the second cell performs only the service of the NR system, since the symbol location of DMRS transmitted by the second cell to the UE is not changed, but the symbol location of DMRS transmitted by the first cell to the UE is changed, it may occur a problem that the symbol locations between the two DMRSs are not the same.

In order to solve this problem, they are required to rate match data at the corresponding RE location and to change the symbol location of the DMRS by delivering, by the second cell that does not transmit the CRS, information on a CRS rate matching pattern to the UEs supported by the second cell. Such a configuration and/or instruction may be delivered through a Synchronization Signal Block (SSB), a Master Information Block (MIB), and/or a System Information Block (SIB), etc. However, in the case of the method, since the second cell does not actually transmit the CRS, data resources may be wasted due to unnecessary data rate matching.

In consideration of this point, in the present disclosure, a method(s) of applying an efficient CRS rate matching pattern and a method(s) of determining a DMRS symbol location are proposed. The embodiments described below are only divided for convenience of description, and some configurations and/or methods of one embodiment may be substituted with configurations and/or methods of other embodiments, or may be applied in combination with each other.

First Embodiment

In the present embodiment, when the UE does not receive information about a CRS-related pattern (e.g. CRS rate matching pattern) from all transmission and reception points (TRPs), a method of applying the CRS-related pattern and a method of determining the location of the DMRS symbol will be described. In the following description, it is described based on "TRP", but as described above, "TRP" may be replaced with and applied for expressions such as a panel, a cell, a transmission point (TP), a base station (gNB, etc.), and the like.

In addition, as described above, the TRP may be divided according to information (e.g. index) on the CORESET group (or CORESET pool). As an example, when one UE is configured to perform transmission and reception with a plurality of TRPs (or cells), this may mean that a plurality of CORESET groups (or CORESET pools) are configured for one UE. The configuration of such a CORESET group (or CORESET pool) may be performed through higher layer signaling (e.g. RRC signaling, etc.). In addition, when the plurality of CORESET groups are configured for one UE, the corresponding UE may be configured or defined to receive data using a multi-DCI-based M-TRP operation.

For example, cases may occur in which a UE receiving data (respectively) from two TRPs (or two cells) (hereinafter, referred to as a first TRP and a second TRP for convenience of description) is configured or instructed information about the CRS rate matching pattern from the first TRP, and is not configured or not instructed information about the CRS rate matching pattern from the second TRP.

In this case, it is assumed that the UE is configured or instructed information on the CRS rate matching pattern from the second TRP, and the UE may receive data from the second TRP by performing rate matching at the RE location allocated to the CRS. That is, the UE may perform the CRS rate matching related to data reception by applying equally information on the CRS rate matching pattern received from the first TRP to the second TRP. Through this, rate matching may be performed on the data resource of the second TRP, and the second TRP may not interfere with the CRS of the first TRP. Alternatively, the UE may be configured to puncture data received from the second TRP at the RE location allocated to the CRS. If inter-cell cooperation is not configured, since the second TRP cannot perform rate matching with respect to the RE location allocated to the CRS, it may be efficient for the UE to puncture data at the RE location allocated to the CRS.

In addition, in the case of the above example, the UE may determine the symbol location of the DMRS (i.e. the OFDM symbol location) assuming that information on the CRS rate matching pattern has been configured or instructed for both TRPs. That is, the UE did not receive the information on the CRS rate matching pattern from the second TRP, but may also apply the information on the CRS rate matching pattern received from the first TRP to the second TRP. When the symbol location of the DMRS and the symbol location of the CRS overlap (or collide) by applying the CRS rate matching pattern for the second TRP, the UE may receive data transmitted from the second TRP by changing (or shifting) the symbol location of the DMRS of the second TRP.

In addition, the first TRP may deliver information indicating that the information on the CRS rate matching pattern is transmitted to the UE and information on the corresponding CRS rate matching pattern to the second TRP. At this time, a backhaul connection between the first TRP and the second TRP may be used. When the second TRP performs data transmission to the UE, the second TRP may change (or shift) the symbol location of the DMRS by applying (or, assuming applying) the CRS rate matching pattern received from the first TRP, or may perform a rate matching operation on data. At this time, the second TRP does not perform the CRS transmission as described above.

In addition, the method proposed in the present embodiment has been described based on the case of the two TRPs for convenience of description, but it may be extended and applied even in the case of transmitting and receiving data using the same frequency time resource between a plurality of TRPs and the UE. In other words, when the UE receives information about the CRS rate matching pattern from one or more TRPs, the corresponding UE may perform the rate matching operation on data by assuming the configuration and/or reception of the CRS rate matching pattern for the remaining TRP(s) (that is, by applying the CRS rate matching pattern received from other TRP(s)), and may determine the symbol location of the DMRS.

In addition, when the symbol location of the DMRS of the second TRP is changed based on the CRS rate matching pattern delivered from the first TRP as described above, the processing time of the PDSCH transmitted from the second TRP may also be changed.

The operation of the UE related to the method proposed in the present embodiment may be as in the following example. As an example, when a UE receiving data from the two TRPs receives information about the CRS rate matching pattern from one TRP (e.g. the first TRP), and does not receive information about the CRS rate matching pattern from the remaining TRP (e.g. the second TRP), the corresponding UE may perform the rate matching operation on data assuming that the CRS rate matching pattern is instructed for both TRPs, and may determine the symbol location of the DMRS (that is, the OFDM symbol location). That is, the UE may perform the rate matching operation on data by applying the CRS rate matching pattern instructed from the first TRP to data/DMRS reception from the second TRP, and determine the symbol location of the DMRS.

The operation of the base station related to the method proposed in the present embodiment may be as in the following example. As an example, the second TRP may receive information about the CRS rate matching pattern from the first TRP. After that, when the second TRP transmits data to the UE receiving data from both the first TRP and the second TRP, the second TRP may perform the rate matching operation on data by applying the CRS rate matching pattern of the first TRP, determine the symbol location of the DMRS, and transmit the data and the DMRS to the UE. The second TRP does not transmit the CRS to the UE. In addition, when the second TRP transmits data to the UE that receives data from the second TRP without receiving data from the first TRP, the second TRP may not apply the CRS rate matching pattern of the first TRP.

When the method proposed in the present embodiment is applied, when the UE receives data from the two TRPs, the DMRS symbol locations of the two TRPs may always be the same, the UE has an effect of receiving data without i) interference between the DMRS of the first TRP and the data of the second TRP and ii) the interference between the DMRS of the second TRP and the data of the first TRP through the rate matching operation on the data.

Second Embodiment

In the present embodiment, when the UE receives information on the CRS-related pattern (e.g. CRS rate matching pattern) from all transmission and reception points (TRPs), a method of applying the CRS-related pattern and a method of determining the location of the DMRS symbol will be described. In the following description, it is described based on "TRP", but as described above, "TRP" may be replaced with and applied for expressions such as a panel, a cell, a transmission point (TP), and a base station (gNB, etc.).

In addition, as described above, the TRP may be divided according to information (e.g. index) on the CORESET group (or CORESET pool). As an example, when one UE is configured to perform transmission and reception with a plurality of TRPs (or cells), this may mean that a plurality of CORESET groups (or CORESET pools) are configured for one UE. The configuration of such a CORESET group (or CORESET pool) may be performed through higher layer signaling (e.g. RRC signaling, etc.). In addition, when the plurality of CORESET groups are configured for one UE, the corresponding UE may be configured or defined to receive data using a multi-DCI-based M-TRP operation.

For example, when two TRPs all support co-existence of the NR system and the LTE system, the two TRPs may transmit the CRS to the UE. However, CRS configurations of the two TRPs may be different from each other, and in order to remove interference between CRSs transmitted in the two TRPs, different shift values (e.g. v-shift values) may be configured. The CRS configuration may be configured through parameters (e.g. higher layer signaling parameters, RRC parameters, etc.) such as the following example. As an example, the CRS configuration may include shift information configured with LTE-CRS-vshift(s) (e.g. v-shift), port information configured with LTE-CRS antenna ports {1, 2, 4} (e.g. nrofCRS-Ports), frequency information indicating the LTE carrier centre subcarrier location determined by the offset from (reference) point A (e.g. carrierFreqDL), and/or bandwidth information indicating the LTE carrier bandwidth (e.g. carrierBandwidthDL), etc. In addition, the CRS configuration may configure information (e.g. mbsfn-Subframe-ConfigList) indicating Multimedia Broadcast Single Frequency Network (MBSFN) subframe configuration.

In the case of the above example, each TRP performing cooperative transmission may exchange (i.e. transmit/receive) information on the CRS configuration with each other. Through this, the PDSCH rate matching operation may be performed not only for the CRS transmitted by itself but also for the CRS transmitted by other TRPs, and interference between the PDSCH and the CRS may be alleviated. The UE may receive the CRS configurations of all TRPs performing the cooperative transmission, and may receive data by performing a rate matching operation of the PDSCH transmitted by each TRP for all CRSs.

In addition, in the case of the above example, when there is a collision between the DMRS symbol and the CRS of the other TRP participating in the cooperative transmission even if there is no collision between the DMRS symbol and the CRS transmitted by the TRP, each TRP may transmit own DMRS by changing (shifting) the symbol location of its own DMRS. Even if the DMRS symbol location of one TRP does not overlap with the CRS, when the DMRS symbol location of another TRP overlaps with the CRS, the corresponding TRP may change its DMRS symbol location in order to configure the DMRS symbol location of the other TRP and its own DMRS symbol location to be the same. That is, when the UE needs to change (or shift) the symbol location of the DMRS in order to avoid collision between the CRS and the DMRS even in one of the TRPs performing the cooperative transmission, the UE may receive data (from the TRPs) by recognizing (or assuming) that the symbol location of the DMRS is changed (or shifted) for the remaining TRPs.

Alternatively, the UE may not expect that some or all of the corresponding configuration are different between the CRS configuration of each of a plurality of TRPs performing the cooperative transmission. That is, the UE may expect that some or all of the CRS configuration of each of the plurality of TRPs performing the cooperative transmission are the same. In other words, in the case of the cooperative transmission based on the plurality of TRPs, the UE may transmit and receive data based on that some or all of the CRS configuration of each TRP are the same.

Third Embodiment

In relation to the above-described multiple DCI (M-DCI)-based cooperative transmission and/or single DCI (S-DCI)-based cooperative transmission, the rate matching operation of the PDSCH (i.e. data) in consideration of the CRS may be performed differently based on the configuration of each TRP-related CORESET and/or CORESET group (or CORESET pool). And/or, the rate matching operation of the PDSCH may be differently performed based on a search space (e.g. common search space (CSS), user-specific search space (USS)) in which the PDCCH (or DCI) transmitted by each TRP is detected (or transmitted).

In the present embodiment, in relation to M-DCI-based cooperative transmission and/or S-DCI-based cooperative transmission, PDSCH rate matching methods for the CRS (hereinafter, methods 1) to 8)) will be described. Here, the PDSCH rate matching may mean a rate matching operation for the PDSCH, that is, data.

Method 1)

In the single DCI-based M-TRP scheme, the PDSCH rate matching may be performed for all of a plurality of CRS patterns. That is, when the data stream is mapped to the RE, data is not mapped to the RE for CRS transmission corresponding to the union of a plurality of CRS patterns. Through this, implementation complexity of the PDSCH rate matching may be reduced.

In order to increase the efficiency of RE resources for data, it may be considered a scheme in which the layer(s) transmitted through the DMRS port(s) using the i-th TCI state perform PDSCH rate matching for the i-th CRS pattern, and does not perform PDSCH rate matching for the remaining CRS patterns. Alternatively, the base station may transmit (or instruct) to the UE information on which CRS pattern among a plurality of CRS patterns to perform (or apply)

PDSCH rate matching for the layer(s) transmitted through the DMRS port(s) using the i-th TCI state. The layer(s) transmitted through the DMRS port(s) using the i-th TCI state may be defined as port(s)/layer(s) belonging to a specific DMRS CDM group connected to the i-th TCI state. As an example, a first TCI state may be associated with a first CDM group, and a second TCI state may be associated with a second CDM group. In this case, a CRS pattern to which PDSCH rate matching is applied may be determined according to the port(s)/layer(s) belonging to which DMRS DCM group. For example, in the case of port(s)/layer(s) belonging to the i-th CDM group, the UE and/or the base station may perform or apply the PDSCH rate matching for the i-th CRS pattern.

For example, when cooperative transmission by two TRPs is performed, two TCI states (i.e. a first TCI state and a second TCI state) may be instructed through the DCI, and two CRS patterns (i.e. a first CRS pattern and a second CRS pattern) may be instructed through higher layer signaling (e.g. RRC signaling). In this case, it may be configured so that DMRS $\{0, 1, 2, 3\}$ may be used in rank 4 transmission, the corresponding DMRS $\{0, 1, 2, 3\}$ may correspond to the layer $\{0, 1, 2, 3\}$ in order, in case of DMRS $\{0, 1\}$, QCL-related information may be obtained through the first TCI state, and in case of DMRS $\{2, 3\}$, QCL-related information may be obtained through the second TCI state. In this case, the base station and/or the UE may rate-match the first CRS pattern for the layer $\{0, 1\}$ corresponding to the DMRS $\{0, 1\}$, and rate-match the second CRS pattern for the layer $\{2, 3\}$ corresponding to the DMRS $\{2, 3\}$. That is, only layers $\{2, 3\}$ may be transmitted/received to the RE(s) corresponding to the first CRS pattern, and only layers $\{0, 1\}$ may be transmitted/received to the RE(s) corresponding to the second CRS pattern.

Method 2)

In the multi-DCI-based M-TRP scheme, PDSCH rate matching may be performed for all of a plurality of CRS patterns. That is, when the data stream is mapped to the RE, data is not mapped to the RE for CRS transmission corresponding to the union of a plurality of CRS patterns. Through this, the implementation complexity of the PDSCH rate matching may be reduced.

In order to increase the efficiency of RE resources for data, in the multi-DCI-based M-TRP scheme, a rate matching operation for a PDSCH transmitted by each TRP may be performed only for a CRS transmitted by each TRP. The UE may classify the TRP according to which CORESET group (or CORESET pool) the CORESET in which the DCI for scheduling the PDSCH is received belongs to (i.e. according to index configured in the corresponding CORESET). Accordingly, when the CORESET group and the CRS pattern are connected (or mapped) in a one-to-one relationship and the CORESET group is identified, the UE may perform a rate matching operation for the PDSCH based on the corresponding CRS pattern.

As an example, when cooperative transmission between two TRPs is performed, the first TRP may transmit first DCI through the CORESET of the first CORESET group, and transmit the first PDSCH scheduled through the corresponding DCI. Similarly, the second TRP may transmit second DCI through the CORESET of the second CORESET group and transmit the second PDSCH scheduled through the corresponding DCI. In addition, the base station may instruct and/or deliver information on two CRS patterns to the UE, and may also instruct and/or deliver information on the association (or mapping) relationship between the CRS pattern and the CORESET group. For example, the i-th CRS pattern and the i-th CORESET group may be connected in a one-to-one relationship, or the base station may configure and/or instruct an arbitrary association relationship to the UE. The UE may perform rate matching on the first CRS pattern connected to the first CORESET group for the first PDSCH, and may perform rate matching on the second CRS pattern connected to the second CORESET group for the second PDSCH.

In addition, when the CRS transmission resource (e.g. RE of lte-CRSToMatchAround) and the resource of the PDCCH (e.g. RE of the PDCCH candidate) overlap, the UE may not need to monitor the resource of the PDCCH.

Method 3)

In the single DCI-based M-TRP scheme, when RE(s) corresponding to a plurality of instructed CRS patterns and RE(s) of a PDCCH candidate overlap, the UE may not monitor the corresponding PDCCH candidate. In this case, as the probability of occurrence of overlap between the CRS pattern and the PDCCH candidate increases, the probability of not monitoring the corresponding PDCCH candidate may increase. As an example, when a plurality of 4-port CRS patterns are instructed, since there are many RE(s) allocated to the CRS, most of the PDCCH candidate(s) may not be monitored.

Considering the above, since only one TRP is transmitted among a plurality of TRPs participating in the cooperative transmission, a method of determining whether to monitor a corresponding PDCCH candidate by determining whether the PDCCH candidate overlaps with only one CRS pattern (transmitted by a TRP transmitting DCI) among a plurality of instructed CRS patterns may be applied. At this time, if even one RE overlaps, the UE may not monitor the corresponding PDCCH candidate. One CRS pattern for determining whether to overlap may be fixed as the first CRS pattern (or the CRS pattern of the lowest/highest index) among a plurality of instructed CRS patterns, or the base station may instruct to the UE by selecting or determining one CRS pattern. In addition, when the remaining CRS pattern(s) other than the one CRS pattern overlap with the PDCCH candidate, the PDCCH candidate may be punctured or rate-matched to be transmitted in the RE(s) of the overlapped CRS. Through this, interference between the PDCCH and the CRS may be removed.

In addition, although only one TRP among a plurality of TRPs participating in cooperation transmits the DCI, may be dynamically changed whether which TRP among a plurality of TRPs transmits the corresponding DCI. For example, while the first TRP transmits the DCI and the first TRP and the second TRP transmit a PDSCH scheduled by the corresponding DCI, when the quality of the downlink control channel of the first TRP is low, the second TRP may transmit the DCI, and the first TRP and the second TRP may transmit a PDSCH scheduled by the corresponding DCI. In this case, when monitoring the PDCCH in a specific CORESET, it is determined whether an overlap occurs between the CRS pattern connected to the corresponding CORESET and the PDCCH candidate, and when the overlap occurs, the UE may not monitor the corresponding PDCCH candidate. At this time, one CRS pattern may be connected for each CORESET, or the base station may deliver information on an arbitrary connection relationship to the UE. In addition, when the UE monitors the PDCCH in the specific CORESET, if the CRS pattern not linked to the corresponding CORESET and the PDCCH candidate overlap, in the RE(s) of the overlapped CRS, the corresponding PDCCH candidate may be punctured or rate matched to be transmitted. Through this, interference between the PDCCH and the CRS may be removed.

Method 4)

In multiple DCI-based M-TRP, a plurality TRPs participating in cooperation transmit DCI and data, respectively. Therefore, it is determined whether there is overlap between the CRS and the PDCCH candidate transmitted from the same TRP, and when an overlap occurs in some RE(s), the UE may not monitor the corresponding PDCCH candidate. However, when the TRP for transmitting the CRS and the TRP for transmitting the PDCCH are different, it may be preferable for the UE to monitor the corresponding PDCCH candidate even if the CRS and the PDCCH candidates overlap. This is because, if the PDCCH candidate is not monitored, the number of the monitored PDCCH candidate is reduced, the degree of freedom of the PDCCH transmission of the base station is reduced. Therefore, when monitoring the PDCCH in the specific CORESET, it is determined whether the CRS pattern connected to the corresponding CORESET and the PDCCH candidate overlap, and if the overlap occurs, it may be considered a scheme of configuring the UE not to monitor the corresponding PDCCH candidate. At this time, one CRS pattern may be connected for each CORESET, or the base station may deliver information on an arbitrary connection relationship to the UE. In addition, when the UE monitors the PDCCH in the specific CORESET, if the CRS pattern not connected to the corresponding CORESET and the PDCCH candidate overlap, in the RE(s) of the overlapped CRS, the corresponding PDCCH candidate may be punctured or rate-matched to be transmitted. Through this, interference between the PDCCH and the CRS may be removed.

Method 5)

If there is no CRS pattern connected to the CORESET group and/or CORESET, the base station and/or the UE may not perform PDSCH rate matching based on the CRS pattern for the PDSCH scheduled with the corresponding CORESET group and/or the corresponding CORESET. At this time, the UE may monitor the PDSCH candidate(s) of the corresponding CORESET group and/or CORESET.

Method 6)

When the number of CRS patterns configured in one serving cell is 2 or more, there is a CRS pattern linked for each CORESET, and rate matching may be performed on the PDSCH scheduled by the DCI received through the i-th CORESET based on the CRS pattern linked to the i-th CORESET. When an overlap occurs between the PDCCH candidate transmitted through the i-th CORESET and the CRS pattern connected to the i-th CORESET, the UE may not monitor the corresponding PDCCH candidate.

In addition, when the number of CRS patterns configured in one serving cell is 1, the UE may perform rate matching on the PDSCH transmitted by the serving cell in the RE(s) allocated to the CRS. If overlap occurs between the corresponding CRS and the PDCCH candidate, the UE may not monitor the corresponding PDCCH candidate. This may be regardless of CORESET of DCI scheduling PDSCH and/or CORESET in which PDCCH candidates are transmitted.

For example, in the above schemes, when there is one CRS pattern configured in the serving cell, since the number of REs of the CRS is small, the UE may rate-match the PDSCH without distinction of CORESET and may not monitor the PDCCH candidate. On the other hand, when there are a plurality of CRS patterns configured in the serving cell, since the number of REs in the CRS is large, the operation of the above example may not be preferable in terms of resource efficiency. Therefore, when there are a plurality of CRS patterns, the UE may perform rate matching on the PDSCH and not monitor the PDCCH candidate only when the TRP transmitting the CRS, PDSCH, and/or PDCCH candidate is the same. Since different TRPs configure different CORESETs, the UE may perform rate matching on the PDSCH only for CRS, PDSCH, and/or PDCCH candidates configured in (or connected to) the same CORESET, and may not monitor the PDCCH candidates. The CORESET in the expression "PDSCH configured in CORESET" may mean CORESET in which the DCI scheduling the PDSCH is transmitted. In addition, the CORESET in the expression "PDCCH candidate configured in CORE-SET" may mean CORESET in which the PDCCH candidate is transmitted.

Method 7)

The UE may determine whether overlap occurs between a PDCCH candidate of the common search space (CSS) and a specific one CRS pattern, and if the overlap occurs, the UE may not monitor the corresponding PDCCH candidate. Here, the specific one CRS pattern may be fixed as the first CRS pattern among a plurality of instructed CRS patterns, or may be selected by the base station and instructed to the UE. In addition, the UE may determine whether overlap occurs between the union of all CRS patterns instructed in the UE-specific search space (USS) and the PDCCH candidate, and when the overlap occurs, the UE may not monitor the corresponding PDCCH candidate. Such a scheme may be effective when one TRP in the CSS transmits the PDCCH steady and one TRP among a plurality of TRPs in the USS transmits the PDCCH.

In the case of the PDSCH, the base station and/or the UE may perform a PDSCH rate matching operation for a PDSCH scheduled through the CSS based on one specific CRS pattern. Here, the specific one CRS pattern may be fixed as the first CRS pattern among a plurality of instructed CRS patterns, or may be selected by the base station and instructed to the UE. In addition, the base station and/or the UE may perform a PDSCH rate matching operation for the PDSCH scheduled through the USS based on the union of CRS pattern(s). In addition, in the case of the USS, one CRS pattern associated with the corresponding CORESET group and/or the corresponding CORESET may exist for one CORESET group and/or CORESET associated with each USS. Here, the one CRS pattern may be referred to as a CRS pattern associated with the USS. The base station and/or the UE may perform a rate matching operation on the PDSCH scheduled through the USS based on the CRS pattern associated with the USS.

Method 8)

When a collision (or overlap) occurs between a PDCCH candidate and a CRS, if the corresponding CRS is a CRS pattern associated with the CORESET and/or CORESET group to which the PDCCH candidate belongs, the UE may not monitor the corresponding PDCCH candidate. On the other hand, when a collision (or overlap) occurs between the PDSCH and the CRS, the UE may perform a PDSCH rate matching operation based on all configured CRS patterns. Through this, occurrence of excessive monitoring skip for control information can be prevented, and the data is free from various MCS configuration, coding rate adjustment, and allocation RB adjustment when compared with the control information, so the UE may successfully transmit data through scheduling even if the PDSCH rate matching is performed according to all CRS patterns.

In the above-described methods, the CORESET group may include one or more CORESETs. When the CORESET group consists of only one CORESET, the corresponding CORESET group may have the same meaning as the CORE-SET. In this case, the CORESET group described in the above methods may be replaced with the CORESET, and the CORESET may be replaced with the CORESET group. In addition, it goes without saying that the above-described methods are only separated for convenience of description, and a plurality of methods may be applied in combination with each other.

FIG. 10 illustrates an example of signaling between a network side and a UE in a multi-TRP-based transmission and reception situation to which a method proposed in the present disclosure can be applied. FIG. 10 is only for convenience of description, and does not limit the scope of the present disclosure. Here, the network side and the UE are only examples, and may be replaced with various devices described with reference to FIGS. 13 to 19. AI so, some step(s) described in FIG. 10 may be omitted depending on network situations and/or configurations.

Referring to FIG. 10, signaling between two TRPs and a UE is considered for convenience of description, but it goes without saying that the corresponding signaling scheme may be extended and applied to signaling between a plurality of TRPs and a plurality of UEs. In the following description, the network side may be one base station including the plurality of TRPs, and may be one cell including the plurality of TRPs. For example, an ideal/non-ideal backhaul may be configured between a first TRP (TRP 1) and a second TRP (TRP 2) constituting the network side. In addition, the following description will be described based on the plurality of TRPs, which may be equally extended and applied to transmission through a plurality of panels. In addition, in the present disclosure, an operation in which the UE receives a signal from the first TRP/second TRP may be interpreted/described as an operation (or may be an operation) in which the UE receives a signal from the network side (through/using the first TRP/second TRP), and an operation in which the UE transmits a signal to the first TRP/second TRP may be interpreted/described as an operation (or may be an operation) in which the UE transmits a signal to the network side (through/using the first TRP/second TRP), and vice versa.

Specifically, FIG. 10 illustrates an example of signaling when the UE receives multiple DCIs (that is, when the network side transmits DCI to the UE through/using each TRP) in an M-TRP (or a cell, hereinafter all TRPs can be replaced by a cell/panel, or M-TRP can be assumed even when a plurality of CORESETs are configured from one TRP) situation.

The UE may receive configuration information related to multi-TRP-based transmission and reception through/using the first TRP (and/or the second TRP) from the network side (S1005). The configuration information, as described in the above-mentioned method (e.g. the first embodiment, the second embodiment, the third embodiment, etc.), may include information related to configuration (i.e. TRP configuration) on the network side/resource information (resource allocation) related to multi-TRP-based transmission and reception, etc. For example, the configuration information may include CRS rate matching pattern information (e.g. CRS rate matching pattern information per TRP/cell). For example, the configuration information may include information related to CORESET and/or CORESET group (or CORESET pool). In this case, the configuration information may be delivered through higher layer signaling (e.g. RRC signaling, MAC-CE, etc.). In addition, when the configuration information is predefined or configured, the corresponding step may be omitted.

For example, the operation of receiving the configuration information related to the multi-TRP-based transmission/reception from the network side (e.g. 1010/1020 in FIGS. 13 to 19) by the UE (e.g. 1010/1020 in FIGS. 13 to 19) in step S1005 described above may be implemented by the devices of FIGS. 13 to 19 to be described below. For example, referring to FIG. 14, one or more processors 102 may control one or more transceivers 106 and/or one or more memories 104, etc. to receive the configuration information, and the one or more transceivers 106 may receive the configuration information from the network side.

The UE may receive a first DCI (DCI 1) and a first data (Data 1) scheduled by the first DCI through/using the first TRP from the network side (S1010-1). In addition, the UE may receive a second DCI (DCI 2) and a second data (Data 2) scheduled by the second DCI through/using the second TRP from the network side (S1010-2). For example, as described in the above-described method (e.g. the first embodiment, the second embodiment, the third embodiment, etc.), the first DCI and/or the second DCI may be transmitted/received through a PDCCH, and may include scheduling information for a PDSCH for transmission/reception of the first data and/or the second data.

In addition, DCI (e.g. first DCI, second DCI) and data (e.g. first data, second data) may be delivered through a control channel (e.g. PDCCH, etc.) and a data channel (e.g. PDSCH, etc.), respectively. In addition, steps S1010-1 and S1010-2 may be performed simultaneously or one may be performed earlier than the other.

For example, the UE, as described in the above-described method (e.g. the first embodiment, the second embodiment, the third embodiment, etc.) for each control channel (e.g. PDCCH) through which each DCI (e.g. first DCI/second DCI) is transmitted and/or a data channel (e.g. PDSCH) through which each data (e.g. first data/second data) is transmitted, may apply/perform rate matching. Alternatively, the UE may not receive/detect/monitor each control channel (e.g. PDCCH) through which each DCI (e.g. first DCI/second DCI) is transmitted and/or a data channel (e.g. PDSCH) through which each data (e.g. first data/second data) is transmitted as described in the above-described method (e.g. the first embodiment, the second embodiment, the third embodiment, etc.).

For example, the operation of receiving the first DCI and/or the second DCI, the first data and/or the second data from the network side (e.g. 1010/1020 in FIGS. 13 to 19) by the UE (e.g. 1010/1020 in FIGS. 13 to 19) in steps S1010-1 and S1010-2 described above may be implemented by the devices of FIGS. 13 to 19 to be described below. For example, referring to FIG. 14, one or more processors 102 may control one or more transceivers 106 and/or one or more memories 104, etc. to receive the first DCI and/or the second DCI, the first data and/or the second data, and the one or more transceivers 106 may receive the first DCI and/or the second DCI, the first data and/or the second data from the network side.

The UE may decode the first data and/or the second data received through/using the first TRP and/or the second TRP from the network side (S1015). For example, the UE may perform channel estimation and/or decoding on data based on the above-described method (e.g. the first embodiment, the second embodiment, the third embodiment, etc.). For example, the UE may perform channel estimation and decoding considering that rate matching is applied/performed (or by applying/performing rate matching) as described in the above method (e.g. the first embodiment, the second embodiment, the third embodiment, etc.) for each control channel (e.g. PDCCH) through which each DCI (e.g. first DCI/second DCI) is transmitted and/or for data channel (e.g. PDSCH) through which each data (e.g. first data/ second data) is transmitted. Alternatively, decoding may not be performed on DCI (e.g. first DCI/second DCI) and/or data (e.g. first data/second data) that are not received/ detected as described in the above method (e.g. the first embodiment, the second embodiment, the third embodiment, etc.) for each control channel (e.g. PDCCH) through which each DCI (e.g. first DCI/second DCI) is transmitted and/or for data channel (e.g. PDSCH) through which each data (e.g. first data/second data) is transmitted.

For example, the operation of decoding the first data and the second data by the UE (e.g. 1010/1020 in FIGS. 13 to 19) in step S1015 described above may be implemented by the devices of FIGS. 13 to 19 to be described below. For example, referring to FIG. 14, one or more processors 102 may control to decode the first data and the second data.

The UE may transmit HARQ-ACK information (e.g. ACK information, NACK information, etc.) for the first data and/or the second data to the network side through/using the first TRP and/or the second TRP (S1020-1, S1020-2). In this case, the HARQ-ACK information for the first data and the second data may be combined into one. In addition, the UE is configured to transmit only HARQ-ACK information to a representative TRP (e.g. the first TRP), and transmission of the HARQ-ACK information to another TRP (e.g. the second TRP) may be omitted.

For example, the operation of transmitting the HARQ-ACK information to the network side (e.g. 1010/1020 in FIGS. 13 to 19) by the UE (e.g. 1010/1020 in FIGS. 13 to 19) in steps S1020-1 and S1020-2 described above may be implemented by the devices of FIGS. 13 to 19 to be described below. For example, referring to FIG. 14, one or more processors 102 may control one or more transceivers 106 and/or one or more memories 104, etc. to transmit the HARQ-ACK information, and the one or more transceivers 106 may transmit the HARQ-ACK information to the network side.

FIG. 11 shows an example of an operation flowchart of a terminal receiving data channel in a wireless communication system to which the method proposed in the present disclosure may be applied. FIG. 11 is only for convenience of description, and does not limit the scope of the present disclosure.

The UE may receive control resource configuration information (e.g. COERSET configuration) based on a first control resource set group (e.g. a first CORESET group) and a second control resource set group (e.g. a second CORE-SET group) (S1105). Here, the configuration information may be transmitted and received through higher layer signaling.

For example, the operation of receiving the configuration information by the UE (e.g. 1010/1020 in FIGS. 13 to 19) in step S1105 described above may be implemented by the devices of FIGS. 13 to 19 to be described below. For example, referring to FIG. 14, one or more processors 102 may control one or more transceivers 106 and/or one or more memories 104, etc. to receive the configuration information, and the one or more transceivers 106 may receive the configuration information.

The UE may receive information for a cell reference signal pattern related to one of the first control resource set group and the second control resource set group (S1110). For example, the information for the cell reference signal pattern may be higher layer signaling information (e.g. lte-CRS-ToMatchAtround, etc.). That is, the information for the cell reference signal pattern may be for any one of a first TRP or a second TRP.

For example, the operation of receiving the information for the cell reference signal pattern by the UE (e.g. 1010/ 1020 in FIGS. 13 to 19) in step S1110 described above may be implemented by the devices of FIGS. 13 to 19 to be described below. For example, referring to FIG. 14, one or more processors 102 may control one or more transceivers 106 and/or one or more memories 104, etc. to receive the information for the cell reference signal pattern, and the one or more transceivers 106 may receive the information for the cell reference signal pattern.

The UE may receive i) a first data channel related to the first control resource set group and ii) a second data channel related to the second control resource set group based on the cell reference signal pattern (S1115). For example, the first data channel and the second data channel may be received according to rate matching based on the cell reference signal pattern. In this case, the rate matching may be applied to at least one resource element of a cell reference signal according to the cell reference signal pattern.

In addition, the UE may receive first downlink control information (DCI) based on the first control resource set group and second DCI based on the second control resource set group. The first DCI may be for scheduling the first data channel, and the second DCI may be for scheduling the second data channel. In this case, the first DCI and the first data channel may be received through a first transmission and reception point, and the second DCI and the second data channel may be received through a second transmission and reception point. In this case, the first transmission and reception point and the second transmission and reception point may be configured to perform coordination transmission for the UE.

For example, the operation of receiving the first data channel and the second data channel by the UE (e.g. 1010/1020 in FIGS. 13 to 19) in step S1115 described above may be implemented by the devices of FIGS. 13 to 19 to be described below. For example, referring to FIG. 14, one or more processors 102 may control one or more transceivers 106 and/or one or more memories 104, etc. to receive the first data channel and the second data channel, and the one or more transceivers 106 may receive the first data channel and the second data channel.

FIG. 12 shows an example of an operation flowchart of a BS transmitting data channel in a wireless communication system to which the method proposed in the present disclosure may be applied. FIG. 12 is only for convenience of description, and does not limit the scope of the present disclosure.

The base station may transmit control resource configuration information (e.g. COERSET configuration) based on a first control resource set group (e.g. a first CORESET group) and a second control resource set group (e.g. a second CORESET group) (S1205). Here, the configuration information may be transmitted and received through higher layer signaling.

For example, the operation of transmitting the configuration information by the base station (e.g. 1010/1020 in FIGS. 13 to 19) in step S1205 described above may be implemented by the devices of FIGS. 13 to 19 to be described below. For example, referring to FIG. 14, one or more processors 102 may control one or more transceivers 106 and/or one or more memories 104, etc. to transmit the configuration information, and the one or more transceivers 106 may transmit the configuration information.

The base station may transmit information for a cell reference signal pattern related to one of the first control resource set group and the second control resource set group (S1210). For example, the information for the cell reference signal pattern may be higher layer signaling information (e.g. lte-CRS-ToMatchAtround, etc.). That is, the information for the cell reference signal pattern may be for any one of a first TRP or a second TRP.

For example, the operation of transmitting the information for the cell reference signal pattern by the base station (e.g. 1010/1020 in FIGS. 13 to 19) in step S1210 described above may be implemented by the devices of FIGS. 13 to 19 to be described below. For example, referring to FIG. 14, one or more processors 102 may control one or more transceivers 106 and/or one or more memories 104, etc. to transmit the information for the cell reference signal pattern, and the one or more transceivers 106 may transmit the information for the cell reference signal pattern.

The base station may transmit i) a first data channel related to the first control resource set group and ii) a second data channel related to the second control resource set group based on the cell reference signal pattern (S1215). For example, the first data channel and the second data channel may be transmitted according to rate matching based on the cell reference signal pattern. In this case, the rate matching may be applied to at least one resource element of a cell reference signal according to the cell reference signal pattern.

In addition, the base station may transmit first downlink control information (DCI) based on the first control resource set group and second DCI based on the second control resource set group. The first DCI may be for scheduling the first data channel, and the second DCI may be for scheduling the second data channel. In this case, the first DCI and the first data channel may be transmitted through a first transmission and reception point, and the second DCI and the second data channel may be transmitted through a second transmission and reception point. In this case, the first transmission and reception point and the second transmission and reception point may be configured to perform coordination transmission for the UE.

For example, the operation of transmitting the first data channel and the second data channel by the base station (e.g. 1010/1020 in FIGS. 13 to 19) in step S1215 described above may be implemented by the devices of FIGS. 13 to 19 to be described below. For example, referring to FIG. 14, one or more processors 102 may control one or more transceivers 106 and/or one or more memories 104, etc. to transmit the first data channel and the second data channel, and the one or more transceivers 106 may transmit the first data channel and the second data channel.

As mentioned above, the signaling and operation between the BS and/or the terminal (e.g., FIGS. 10 to 12, etc.) may be implemented by the device (e.g., FIGS. 13 to 19) to be described below. For example, the BS may correspond to a first wireless device, and the terminal may correspond to a second wireless device, and vice versa may be considered in some cases.

For example, the aforementioned signaling and operation between the BS and/or the terminal (e.g., FIGS. 10 to 12, etc.) may be processed by one or more processors (e.g., 102 and 202) of FIGS. 13 to 19, and the aforementioned signaling and operation between the BS and/or the terminal (e.g., FIGS. 10 to 12, etc.) may be stored in the form of an instruction/program (e.g., instruction, executable code) for driving at least one processor (e.g., 102 and 202) of FIGS. 13 to 19 in one or more memories (e.g., 104 and 204) of FIG. 14.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system applied to the present disclosure (1300).

Referring to FIG. 13, a communication system applied to the present disclosure includes wireless devices, BSs (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a handheld device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 1010a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. AI though the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150*a*, sidelink communication 150*b* (or, D2D communication), or inter BS communication (e.g. Relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 14 illustrates wireless devices applicable to the present disclosure.

Referring to FIG. 14, a first wireless device 1010 and a second wireless device 1020 may transmit radio signals through a variety of RATs (e.g., LTE and NR). Herein, {the first wireless device 1010 and the second wireless device 1020} may correspond to {the wireless device 1010*x* and the BS 1020} and/or {the wireless device 1010*x* and the wireless device 1010*x*} of FIG. 13.

The first wireless device 1010 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 1020 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 1010 and 1020 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which
Present Disclosure is Applied

FIG. 15 illustrates a signal processing circuit for a transmit signal.

Referring to FIG. 15, a signal processing circuit 2000 may include a scrambler 2010, a modulator 2020, a layer mapper 2030, a precoder 2040, a resource mapper 2050, and a signal generator 2060. AI though not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 2010 to 2060 may be implemented in the processors 102 and 202 of FIG. 14. Further, blocks 2010 to 2050 may be implemented in the processors 102 and 202 of FIG. 14 and the block 2060 may be implemented in the transceivers 106 and 206 of FIG. 14.

A codeword may be transformed into a radio signal via the signal processing circuit 1000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 15. For example, the wireless device (e.g., 100 or 200 of FIG. 14) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 16 illustrates another example of a wireless device applied to the present disclosure. The wireless device may be implemented in various forms according to a use-case/service (refer to FIG. 13).

Referring to FIG. 16, wireless devices 1010 and 1020 may correspond to the wireless devices 1010 and 1020 of FIG. 14 and may be configured by various elements, components, units/portions, and/or modules. For example, each of the wireless devices 1010 and 1020 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 14. For example, the transceiver(s) 114 may include the one or more transceivers 106 and 106 and/or the one or more antennas 108 and 108 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010a of FIG. 13), the vehicles (1010b-1 and 1010b-2 of FIG. 13), the XR device (1010c of FIG. 13), the hand-held device (1010d of FIG. 13), the home appliance (1010e of FIG. 13), the IoT device (1010f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (1020 of FIG. 13), a network node, etc. The wireless device may be used in a mobile or fixed place according to a use-example/service.

In FIG. 16, the entirety of the various elements, components, units/portions, and/or modules in the wireless devices 1010 and 1020 may be connected to each other through a wired interface or at least a part thereof may be wirelessly connected through the communication unit 110. For example, in each of the wireless devices 1010 and 1020, the control unit 120 and the communication unit 110 may be connected by wire and the control unit 120 and first units (e.g., 130 and 140) may be wirelessly connected through the communication unit 110. Each element, component, unit/portion, and/or module within the wireless devices 1010 and 1020 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an implementation example of FIG. 16 will be described in detail with reference to the accompanying drawings.

Portable Device Example to which Present Disclosure is Applied

FIG. 17 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 16, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

Example of AI Device Applied to the Present Disclosure

FIG. 18 illustrates an example of an AI device applied to the present disclosure. The AI device may be implemented as a fixed device or mobile device, such as TV, a projector, a smartphone, PC, a notebook, a terminal for digital broadcasting, a tablet PC, a wearable device, a set-top box (STB), a radio, a washing machine, a refrigerator, a digital signage, a robot, and a vehicle.

Referring to FIG. 18, the AI device 1010 may include a communication unit 110, a control unit 120, a memory 130, a input/output unit 140*a*/140*b*, a learning processor 140*c*, and a sensing unit 140*d*. Blocks 110~130/140*a*~140*d* correspond to block 110~130/140 in FIG. 16, respectively.

The communication unit 110 may transmit and receive wired/wireless signals (e.g., sensor information, user input, learning models, control signals, etc.) to and from external devices such as another AI device (e.g., FIG. 13, 1010*x*, 1020 or 400) or the AI server (FIG. 13, 400) using wired/wireless communication technology. To this end, the communication unit 110 may transmit information in the memory unit 130 to an external device or transfer a signal received from the external device to the memory unit 130.

The control unit 120 may determine at least one executable operation of the AI device 1010 based on information determined or generated using a data analysis algorithm or a machine learning algorithm. In addition, the control unit 120 may control the components of the AI device 1010 to perform the determined operation. For example, the control unit 120 may request, search for, receive or utilize the data of the learning processor unit 140*c* or the memory unit 130, and control the components of the AI device 1010 to perform predicted operation or operation, which is determined to be desirable, of at least one executable operation. In addition, the control unit 120 may collect history information including operation of the AI device 1010 or user's feedback on the operation and store the history information in the memory unit 130 or the learning processor unit 140*c* or transmit the history information to the AI server (FIG. 13, 400). The collected history information may be used to update a learning model.

The memory unit 130 may store data supporting various functions of the AI device 1010. For example, the memory unit 130 may store data obtained from the input unit 140*a*, data obtained from the communication unit 110, output data of the learning processor unit 140*c*, and data obtained from the sensing unit 140. In addition, the memory unit 130 may store control information and/or software code necessary to operate/execute the control unit 120.

The input unit 140*a* may acquire various types of data from the outside of the AI device 1010. For example, the input unit 140*a* may acquire learning data for model learning, input data, to which the learning model will be applied, etc. The input unit 140*a* may include a camera, a microphone and/or a user input unit. The output unit 140*b* may generate video, audio or tactile output. The output unit 140*b* may include a display, a speaker and/or a haptic module. The sensing unit 140 may obtain at least one of internal information of the AI device 1010, the surrounding environment information of the AI device 1010 and user information using various sensors. The sensing unit 140 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 140*c* may train a model composed of an artificial neural network using training data. The learning processor unit 140*c* may perform AI processing along with the learning processor unit of the AI server (FIG. 13, 400). The learning processor unit 140*c* may process information received from an external device through the communication unit 110 and/or information stored in the memory unit 130. In addition, the output value of the learning processor unit 140*c* may be transmitted to the external device through the communication unit 110 and/or stored in the memory unit 130.

FIG. 19 illustrates an AI server to be applied to the present disclosure.

Referring to FIG. 19, the AI server, 400 in FIG. 13, may mean a device which is trained by an artificial neural network using a machine learning algorithm or which uses a trained artificial neural network. In this case, the AI server 400 is configured with a plurality of servers and may perform distributed processing and may be defined as a 5G network. In this case, the AI server 400 may be included as a partial configuration of the AI device, 1010 in FIG. 18, and may perform at least some of AI processing.

The AI server 400 may include a communication unit 410, a memory 430, a learning processor 440 and a processor 460. The communication unit 410 may transmit and receive data to and from an external device, such as the AI device, 1010 in FIG. 18. The memory 430 may include a model storage unit 431. The model storage unit 431 may store a model (or artificial neural network 431*a*) which is being trained or has been trained through the learning processor 440. The learning processor 440 may train the artificial neural network 431*a* using learning data. The learning model may be used in the state in which it has been mounted on the AI server 400 of the artificial neural network or may be mounted on an external device, such as the AI device, 1010 in FIG. 18, and used. The learning model may be implemented as hardware, software or a combination of hardware and software. If some of or the entire learning model is implemented as software, one or more instructions configuring the learning model may be stored in the memory 430. The processor 460 may deduce a result value of new input data using the learning model, and may generate a response or control command based on the deduced result value.

The AI server 400 and/or the AI device 1010 may be applied by being combined with the robot 1010*a*, the vehicles 101*b*-1 and 1010*b*-2, the extended reality (XR) device 1010*c*, the hand-held device 1010*d*, the home appliance 1010*e*, the IoT (Internet of Thing) device 1010*f* through the network (300 in FIG. 13). The robot 1010*a*, vehicles 1010*b*-1 and 1010*b*-2, extended reality (XR) device 1010*c*, hand-held device 1010*d*, home appliance 1010*e*, and IoT (Internet of Thing) device 1010*f* to which the AI technology is applied may be referred to as AI devices.

Hereinafter, examples of AI devices will be described.

The 1st AI Device Example—AI+Robot

An AI technology is applied to the robot 1010*a*, and the robot 1010*a* may be implemented as a guidance robot, a transport robot, a cleaning robot, a wearable robot, an entertainment robot, a pet robot, an unmanned flight robot, etc. The robot 1010*a* may include a robot control module for controlling an operation. The robot control module may mean a software module or a chip in which a software module has been implemented using hardware. The robot 1010*a* may obtain state information of the robot 1010*a*, may detect (recognize) a surrounding environment and object, may generate map data, may determine a moving path and a running plan, may determine a response to a user interaction, or may determine an operation using sensor information obtained from various types of sensors. In this case, the robot 1010*a* may use sensor information obtained by at least one sensor among LIDAR, a radar, and a camera in order to determine the moving path and running plan.

The robot 1010*a* may perform the above operations using a learning model configured with at least one artificial neural network. For example, the robot 1010*a* may recognize a surrounding environment and object using a learning model, and may determine an operation using recognized surrounding environment information or object information. In this case, the learning model may have been directly trained in the robot 1010*a* or may have been trained in an external device, such as the AI server 400. In this case, the robot 1010*a* may directly generate results using the learning model and perform an operation, but may perform an operation by transmitting sensor information to an external device, such as the AI server 400, and receiving results generated in response thereto.

The robot 1010*a* may determine a moving path and running plan using at least one of map data, object information detected from sensor information, or object information obtained from an external device. The robot 1010*a* may run along the determined moving path and running plan by controlling the driving unit. The map data may include object identification information for various objects disposed in the space in which the robot 1010*a* moves. For example, the map data may include object identification information for fixed objects, such as a wall and a door, and movable objects, such as a flowport and a desk. Furthermore, the object identification information may include a name, a type, a distance, a location, etc.

The robot 1010*a* may perform an operation or run by controlling the driving unit based on a user's control/interaction. In this case, the robot 1010*a* may obtain intention information of an interaction according to a user's behavior or voice speaking, may determine a response based on the obtained intention information, and may perform an operation.

The 2nd AI Device Example—AI+Self-Driving

An AI technology is applied to the self-driving vehicle (1010*b*-1, 1010*b*-2), and the self-driving vehicle (1010*b*-1, 1010*b*-2) may be implemented as a movable type robot, a vehicle, an unmanned flight body, etc. The self-driving vehicle (1010*b*-1, 1010*b*-2) may include a self-driving control module for controlling a self-driving function. The self-driving control module may mean a software module or a chip in which a software module has been implemented using hardware. The self-driving control module may be included in the self-driving vehicle (1010*b*-1, 1010*b*-2) as an element of the self-driving vehicle 100*b*, but may be configured as separate hardware outside the self-driving vehicle 100*b* and connected to the self-driving vehicle (1010*b*-1, 1010*b*-2).

The self-driving vehicle (1010*b*-1, 1010*b*-2) may obtain state information of the self-driving vehicle (1010*b*-1, 1010*b*-2), may detect (recognize) a surrounding environment and object, may generate map data, may determine a moving path and running plan, or may determine an operation using sensor information obtained from various types of sensors. In this case, in order to determine the moving path and running plan, like the robot 1010*a*, the self-driving vehicle (1010*b*-1, 1010*b*-2) may use sensor information obtained from at least one sensor among LIDAR, a radar and a camera. Particularly, the self-driving vehicle (1010*b*-1, 1010*b*-2) may recognize an environment or object in an area whose view is blocked or an area of a given distance or more by receiving sensor information for the environment or object from external devices, or may directly receive recognized information for the environment or object from external devices.

The self-driving vehicle (1010*b*-1, 1010*b*-2) may perform the above operations using a learning model configured with at least one artificial neural network. For example, the self-driving vehicle (1010*b*-1, 1010*b*-2) may recognize a surrounding environment and object using a learning model, and may determine the flow of running using recognized surrounding environment information or object information. In this case, the learning model may have been directly trained in the self-driving vehicle (1010*b*-1, 1010*b*-2) or may have been trained in an external device, such as the AI server 400. In this case, the self-driving vehicle (1010*b*-1, 1010*b*-2) may directly generate results using the learning model and perform an operation, but may perform an operation by transmitting sensor information to an external device, such as the AI server 400, and receiving results generated in response thereto.

The self-driving vehicle (1010*b*-1, 1010*b*-2) may determine a moving path and running plan using at least one of map data, object information detected from sensor information or object information obtained from an external device. The self-driving vehicle (1010*b*-1, 1010*b*-2) may run based on the determined moving path and running plan by controlling the driving unit. The map data may include object identification information for various objects disposed in the space (e.g., road) in which the self-driving vehicle (1010*b*-1, 1010*b*-2) runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle (1010*b*-1, 1010*b*-2) may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

The 3rd AI Device Example—AI+XR

An AI technology is applied to the XR device 1030*c*, and the XR device 1030*c* may be implemented as a head-mount display, a head-up display provided in a vehicle, television, a mobile phone, a smartphone, a computer, a wearable device, home appliances, a digital signage, a vehicle, a fixed type robot or a movable type robot. The XR device 1030c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 1030c may output an XR object, including additional information for a recognized object, by making the XR object correspond to the corresponding recognized object.

The XR device 1030c may perform the above operations using a learning model configured with at least one artificial neural network. For example, the XR device 1030c may recognize a real object in three-dimensional point cloud data or image data using a learning model, and may provide information corresponding to the recognized real object. In this case, the learning model may have been directly trained in the XR device 1030c or may have been trained in an external device, such as the AI server 400. In this case, the XR device 1030c may directly generate results using a learning model and perform an operation, but may perform an operation by transmitting sensor information to an external device, such as the AI server 400, and receiving results generated in response thereto.

The 4th AI Device Example—AI+Robot+Self-Driving Vehicle

An AI technology and a self-driving technology are applied to the robot 1010a, and the robot 1010a may be implemented as a guidance robot, a transport robot, a cleaning robot, a wearable robot, an entertainment robot, a pet robot, an unmanned flight robot, etc. The robot 1010a to which the AI technology and the self-driving technology have been applied may mean a robot itself having a self-driving function or may mean the robot 1010a interacting with the self-driving vehicle (1010b-1, 1010b-2). The robot 1010a having the self-driving function may collectively refer to devices that autonomously move along a given flow without control of a user or autonomously determine a flow and move. The robot 1010a and the self-driving vehicle (1010b-1, 1010b-2) having the self-driving function may use a common sensing method in order to determine one or more of a moving path or a running plan. For example, the robot 1010a and the self-driving vehicle (1010b-1, 1010b-2) having the self-driving function may determine one or more of a moving path or a running plan using information sensed through LIDAR, a radar, a camera, etc.

The robot 1010a interacting with the self-driving vehicle (1010b-1, 1010b-2) is present separately from the self-driving vehicle (1010b-1, 1010b-2), and may perform an operation associated with a self-driving function inside or outside the self-driving vehicle (1010b-1, 1010b-2) or related to a user got in the self-driving vehicle (1010b-1, 1010b-2). In this case, the robot 1010a interacting with the self-driving vehicle (1010b-1, 1010b-2) may control or assist the self-driving function of the self-driving vehicle (1010b-1, 1010b-2) by obtaining sensor information in place of the self-driving vehicle (1010b-1, 1010b-2) and providing the sensor information to the self-driving vehicle (1010b-1, 1010b-2), or by obtaining sensor information, generating surrounding environment information or object information, and providing the surrounding environment information or object information to the self-driving vehicle (1010b-1, 1010b-2).

The robot 1010a interacting with the self-driving vehicle (1010b-1, 1010b-2) may control the function of the self-driving vehicle (1010b-1, 1010b-2) by monitoring a user got in the self-driving vehicle (1010b-1, 1010b-2) or through an interaction with a user. For example, if a driver is determined to be a drowsiness state, the robot 1010a may activate the self-driving function of the self-driving vehicle (1010b-1, 1010b-2) or assist control of the driving unit of the self-driving vehicle (1010b-1, 1010b-2). In this case, the function of the self-driving vehicle (1010b-1, 1010b-2) controlled by the robot 1010a may include a function provided by a navigation system or audio system provided within the self-driving vehicle (1010b-1, 1010b-2), in addition to a self-driving function simply.

The robot 1010a interacting with the self-driving vehicle (1010b-1, 1010b-2) may provide information to the self-driving vehicle (1010b-1, 1010b-2) or may assist a function outside the self-driving vehicle (1010b-1, 1010b-2). For example, the robot 100a may provide the self-driving vehicle (1010b-1, 1010b-2) with traffic information, including signal information, as in a smart traffic light, and may automatically connect an electric charger to a filling inlet through an interaction with the self-driving vehicle (1010b-1, 1010b-2) as in the automatic electric charger of an electric vehicle.

The 5th AI Device Example—AI+Robot+XR

An AI technology and an XR technology are applied to the robot 1010a, and the robot 1010a may be implemented as a guidance robot, a transport robot, a cleaning robot, a wearable robot, an entertainment robot, a pet robot, an unmanned flight robot, a drone, etc. The robot 1010a to which the XR technology has been applied may mean a robot, that is, a target of control/interaction within an XR image. In this case, the robot 1010a is different from the XR device 1010c, and they may operate in conjunction with each other.

When the robot 1010a, that is, a target of control/interaction within an XR image, obtains sensor information from sensors including a camera, the robot 1010a or the XR device 1010c may generate an XR image based on the sensor information, and the XR device 1010c may output the generated XR image. Furthermore, the robot 1010a may operate based on a control signal received through the XR device 1010c or a user's interaction. For example, a user may identify a corresponding XR image at timing of the robot 1010a, remotely operating in conjunction through an external device, such as the XR device 1010c, may adjust the self-driving path of the robot 1010a through an interaction, may control an operation or driving, or may identify information of a surrounding object.

The 6th AI Device Example—AI+Self-Driving Vehicle+XR

An AI technology and an XR technology are applied to the self-driving vehicle (1010b-1, 1010b-2), and the self-driving vehicle (1010b-1, 1010b-2) may be implemented as a movable type robot, a vehicle, an unmanned flight body, etc. The self-driving vehicle (1010b-1, 1010b-2) to which the XR technology has been applied may mean a self-driving vehicle equipped with means for providing an XR image or a self-driving vehicle, that is, a target of control/ interaction within an XR image. Particularly, the self-driving vehicle 100b, that is, a target of control/interaction within an XR image, is different from the XR device 1010c, and they may operate in conjunction with each other.

The self-driving vehicle (1010b-1, 1010b-2) equipped with the means for providing an XR image may obtain sensor information from sensors including a camera, and may output an XR image generated based on the obtained sensor information. For example, the self-driving vehicle (1010b-1, 1010b-2) includes an HUD, and may provide a passenger with an XR object corresponding to a real object or an object within a screen by outputting an XR image. In this case, when the XR object is output to the HUD, at least some of the XR object may be output with it overlapping a real object toward which a passenger's view is directed. In contrast, when the XR object is displayed on a display included within the self-driving vehicle (1010b-1, 1010b-2), at least some of the XR object may be output so that it overlaps an object within a screen. For example, the self-driving vehicle (1010b-1, 1010b-2) may output XR objects corresponding to objects, such as a carriageway, another vehicle, a traffic light, a signpost, a two-wheeled vehicle, a pedestrian, and a building.

When the self-driving vehicle (1010b-1, 1010b-2), that is, a target of control/interaction within an XR image, obtains sensor information from sensors including a camera, the self-driving vehicle (1010b-1, 1010b-2) or the XR device 1010c may generate an XR image based on the sensor information. The XR device 1010c may output the generated XR image. Furthermore, the self-driving vehicle (1010b-1, 1010b-2) may operate based on a control signal received through an external device, such as the XR device 1010c, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

An example in which the method of transmitting and receiving data in a wireless communication system of the present disclosure has been illustrated as being applied to the 3GPP LTE/LTE-A system and 5G system (new RAT system), but the method may be applied to various wireless communication systems in addition thereto.

The invention claimed is:

1. A method performed by a user equipment (UE) in a wireless communication system, the method comprising:
receiving configuration information for configuring a plurality of pools of control resource sets,
wherein a first pool of control resource sets or a second pool of control resource sets is configured based on the configuration information;
receiving i) first information for a first cell reference signal (CRS) pattern related to the first pool of control resource sets or ii) second information for a second CRS pattern related to the second pool of control resource sets, based on the plurality of pools of control resource sets being configured;
receiving first downlink control information (DCI) based on the first pool of control resource sets or second DCI based on the second pool of control resource sets; and
receiving i) a first data channel associated with the first pool of control resource sets or ii) a second data channel associated with the second pool of control resource sets, based on the first information or the second information, wherein the first data channel is scheduled based on the first DCI, and the second data channel is scheduled based on the second DCI,
wherein, in response to a signal configuring a per-CORESET pool index, the first data channel is rate matched on first resource elements indicated by (i) the first CRS pattern in the first information, and the second data channel is rate matched on second resource elements indicated by (ii) the second CRS pattern in the second information.

2. The method of claim 1,
wherein the first data channel or the second data channel is rate matched based on (i) the first CRS pattern in the first information or (ii) the second CRS pattern in the second information.

3. The method of claim 2,
wherein the first data channel or the second data channel is rate matched on resource elements indicated by (i) the first CRS pattern in the first information or (ii) the second CRS pattern in the second information.

4. The method of claim 3,
wherein the first data channel and the second data channel are not mapped to the resource elements indicated by

US 12,609,793 B2

53

(i) the first CRS pattern in the first information and (ii) the second CRS pattern in the second information.

5. The method of claim 1, wherein the first DCI and the first data channel are received through a first transmission and reception point, and the second DCI and the second data channel are received through a second transmission and reception point.

6. The method of claim 5, wherein the first transmission and reception point and the second transmission and reception point are configured to perform coordination transmission for the UE.

7. A user equipment (UE) in a wireless communication system, the UE comprising:
one or more transceivers;
one or more processors; and
one or more memories that store instructions causing, when executed, the one or more processors to perform operations comprising:
receiving configuration information for configuring a plurality of pools of control resource sets,
wherein a first pool of control resource sets or a second pool of control resource sets is configured based on the configuration information;
receiving i) first information for a first cell reference signal (CRS) pattern related to the first pool of control resource sets or ii) second information for a second CRS pattern related to the second pool of control resource sets, based on the plurality of pools of control resource sets being configured;
receiving first downlink control information (DCI) based on the first pool of control resource sets or second DCI based on the second pool of control resource sets; and
receiving i) a first data channel associated with the first pool of control resource sets or ii) a second data channel associated with the second pool of control resource sets, based on the first information or the second information, wherein the first data channel is scheduled based on the first DCI, and the second data channel is scheduled based on the second DCI,
wherein, in response to a signal configuring a per-CORESET pool index, the first data channel is rate matched on first resource elements indicated by (i) the first CRS pattern in the first information, and the second data channel is rate matched on second resource elements indicated by (ii) the second CRS pattern in the second information.

54

8. The UE of claim 7,
wherein the first data channel or the second data channel is rate matched based on (i) the first CRS pattern in the first information or (ii) the second CRS pattern in the second information.

9. The UE of claim 8,
wherein the first data channel or the second data channel is rate matched on resource elements indicated by (i) the first CRS pattern in the first information or (ii) the second CRS pattern in the second information.

10. The UE of claim 9,
wherein the first data channel and the second data channel are not mapped to the resource elements indicated by (i) the first CRS pattern in the first information and (ii) the second CRS pattern in the second information.

11. A device comprising one or more memories and one or more processors functionally connected to the one or more memories,
wherein the one or more processors control the device to:
receive configuration information for configuring a plurality of pools of control resource sets,
wherein a first pool of control resource sets or a second pool of control resource sets is configured based on the configuration information;
receive i) first information for a first cell reference signal (CRS) pattern related to the first pool of control resource sets or ii) second information for a second CRS pattern related to the second pool of control resource sets, based on the plurality of pools of control resource sets being configured;
receive first downlink control information (DCI) based on the first pool of control resource sets and second DCI based on the second pool of control resource sets; and
receive i) a first data channel associated with the first pool of control resource sets or ii) a second data channel associated with the second pool of control resource sets, based on the first information or the second information, wherein the first data channel is scheduled based on the first DCI, and the second data channel is scheduled based on the second DCI,
wherein, in response to a signal configuring a per-CORESET pool index, the first data channel is rate matched on first resource elements indicated by (i) the first CRS pattern in the first information, and the second data channel is rate matched on second resource elements indicated by (ii) the second CRS pattern in the second information.

* * * * *